(12) United States Patent
Ukai

(10) Patent No.: US 11,979,055 B2
(45) Date of Patent: May 7, 2024

(54) VEHICLE POWER SUPPLY SYSTEM

(71) Applicant: HONDA MOTOR CO., LTD., Tokyo (JP)

(72) Inventor: Hayahito Ukai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/945,758

(22) Filed: Sep. 15, 2022

(65) Prior Publication Data

US 2023/0092730 A1 Mar. 23, 2023

(30) Foreign Application Priority Data

Sep. 22, 2021 (JP) ................................. 2021-154815

(51) Int. Cl.
| | |
|---|---|
| *H02J 9/06* | (2006.01) |
| *B60L 3/00* | (2019.01) |
| *B60L 58/18* | (2019.01) |
| *B60R 16/033* | (2006.01) |
| *H02J 7/00* | (2006.01) |

(52) U.S. Cl.
CPC ............ *H02J 9/061* (2013.01); *B60R 16/033* (2013.01); *H02J 7/0029* (2013.01); *B60L 3/0092* (2013.01); *B60L 58/18* (2019.02)

(58) Field of Classification Search
CPC ....... H02J 9/061; H02J 7/0029; B60R 16/033; B60L 58/18; B60L 3/0092
USPC ................................................. 307/9.1, 10.1
See application file for complete search history.

(56) References Cited

U.S. PATENT DOCUMENTS

| | | |
|---|---|---|
| 6,323,608 B1 | 11/2001 | Ozawa |
| 2012/0262106 A1 | 10/2012 | Omiya et al. |
| 2017/0349048 A1 | 12/2017 | Nakayama et al. |
| 2020/0238832 A1 | 7/2020 | Nakayama et al. |
| 2021/0066956 A1* | 3/2021 | Izawa ..................... H02J 7/005 |
| 2021/0261018 A1 | 8/2021 | Murata |
| 2021/0276425 A1* | 9/2021 | Gauthier ............... B60L 3/0092 |
| 2022/0041059 A1 | 2/2022 | Nakayama et al. |

(Continued)

FOREIGN PATENT DOCUMENTS

| | | |
|---|---|---|
| JP | 2004-507996 A | 3/2004 |
| JP | 2017-218013 A | 12/2017 |

(Continued)

OTHER PUBLICATIONS

Mar. 28, 2023, Translation of Japanese Office Action issued for related JP Application No. 2021-154815.

*Primary Examiner* — Michael R. Fin

(74) *Attorney, Agent, or Firm* — Paratus Law Group, PLLC

(57) ABSTRACT

A vehicle power supply system includes: a main power supply system provided with a main low-voltage power supply; and a backup power supply system provided with a backup low-voltage power supply. The backup power supply system includes a backup power supply controller. When the vehicle power supply system is turned off and a state of the vehicle satisfies a predetermined condition, the backup power supply controller executes a backup low-voltage power supply state estimation processing of estimating whether the backup low-voltage power supply is in a state in which the backup low-voltage power supply is able to supply electric power for operating the emergency important load.

9 Claims, 11 Drawing Sheets

(56) References Cited

U.S. PATENT DOCUMENTS

2022/0200311 A1\* 6/2022 Oonishi ................. H02J 9/061
2023/0011332 A1\* 1/2023 Toyooka ................. H02J 9/061

FOREIGN PATENT DOCUMENTS

| JP | 2019-187189 A | 10/2019 |
| WO | WO 2012/104957 A1 | 8/2012 |
| WO | WO 2019/244606 A1 | 12/2019 |
| WO | WO 2020/044938 A1 | 3/2020 |

\* cited by examiner

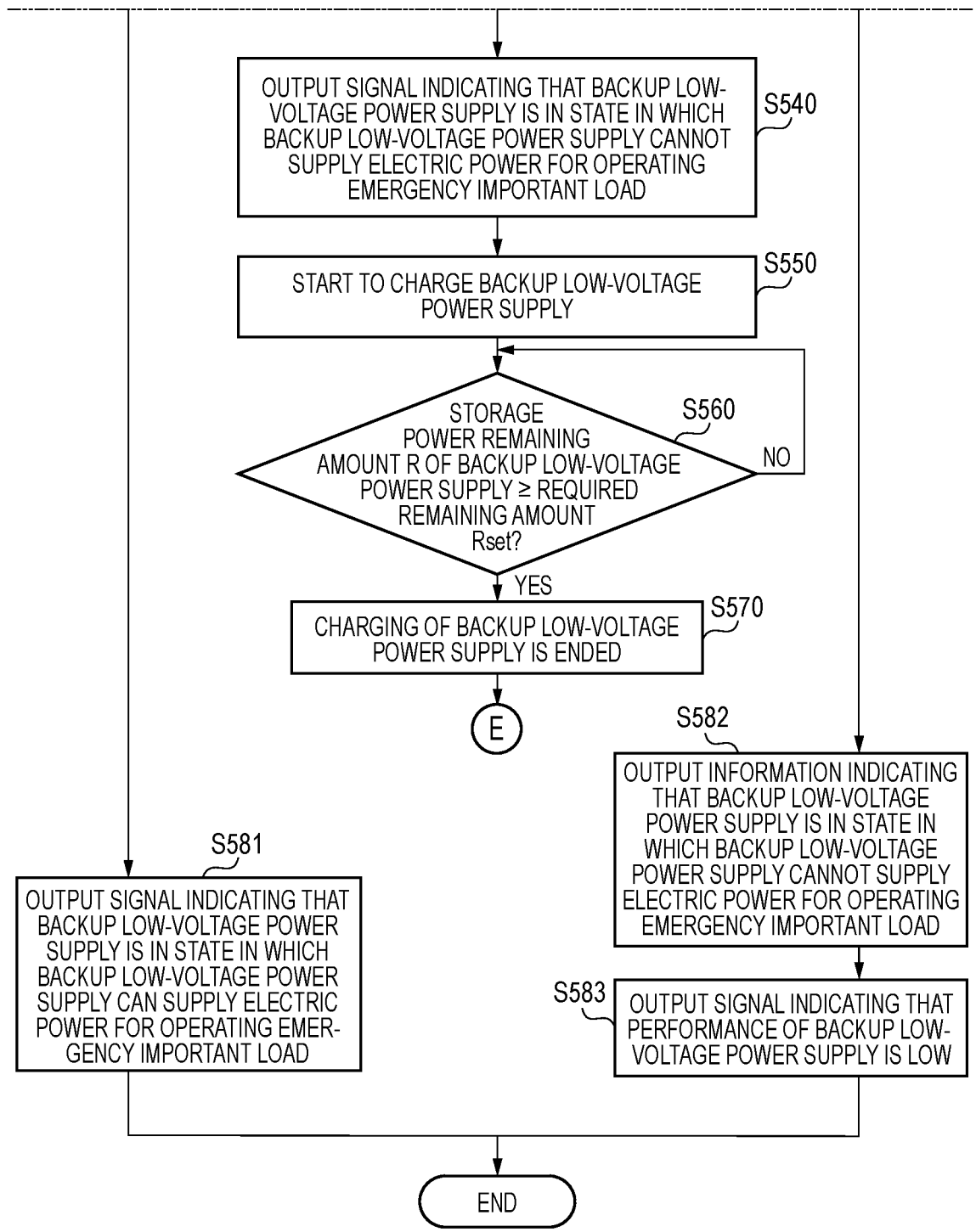
(FIG. 5 Continued)

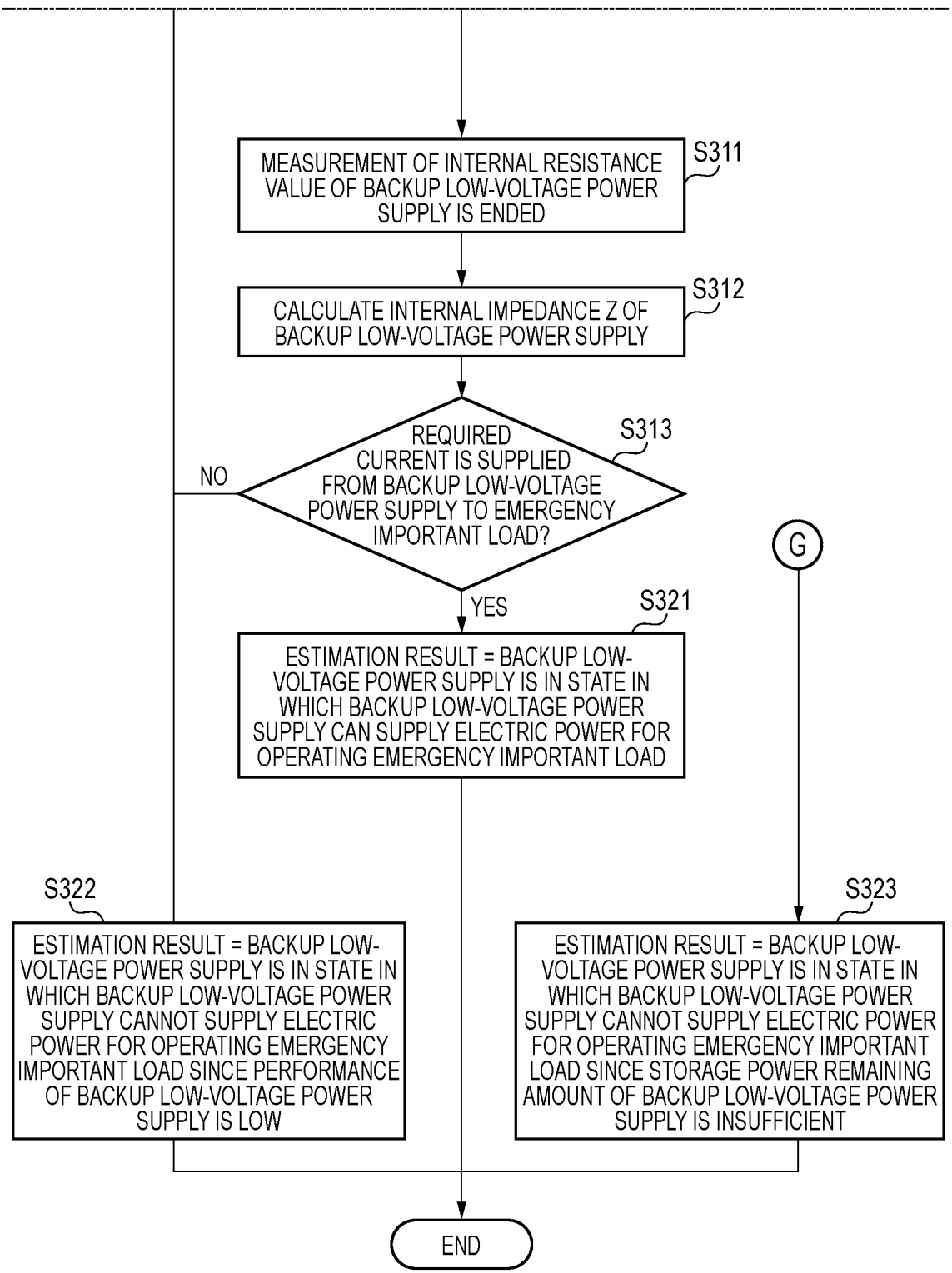

VEHICLE POWER SUPPLY SYSTEM

CROSS REFERENCE TO RELATED APPLICATIONS

This application claims priority to Japanese Patent Application No. 2021-154815 filed on Sep. 22, 2021, the content of which is incorporated herein by reference.

TECHNICAL FIELD

The present invention relates to a vehicle power supply system to be mounted on a vehicle.

BACKGROUND ART

In recent years, it is required to improve traffic safety in order to make cities and human settlements inclusive, safe, resilient and sustainable. From the viewpoint of improving traffic safety, for example, it is required to ensure traffic safety even when an abnormality occurs in a vehicle.

JP 2017-218013 A discloses a vehicle power supply system in which electric power is supplied from a backup power supply to a specific important load when an abnormality occurs in a main power supply, so that the electric power supply to the specific important load can be continued, and even when an abnormality occurs in the main power supply, traffic safety can be secured.

In the vehicle power supply system disclosed in JP 2017-218013 A, in order to reliably supply electric power from the backup power supply to the specific important load when an abnormality occurs in the main power supply, it is preferable to estimate or detect in advance whether the backup power supply is in a state in which the backup power supply is able to supply electric power to the specific important load. As one method of estimating or detecting in advance whether the backup power supply is in a state in which the backup power supply is able to supply electric power to the specific important load, there is a method of calculating an internal impedance of the backup power supply, and in order to calculate the internal impedance of the backup power supply with desired accuracy, it is required to measure an internal resistance value of the backup power supply for a predetermined time (for example, about 5 minutes to 10 minutes).

In this case, an estimation result or a detection result indicating whether the backup power supply is in a state in which the backup power supply is able to supply electric power to the specific important load is not output during a period from when the vehicle power supply system transitions from an OFF state to an ON state up to when an estimation processing or a detection processing of estimating or detecting whether the backup power supply is in a state in which the backup power supply is able to supply electric power to the specific important load is completed. Therefore, for example, in a vehicle capable of autonomous driving, there is a problem that, even when the backup power supply is in a state in which the backup power supply is able to supply electric power to the specific important load, it is not possible to determine whether autonomous driving is possible and autonomous driving cannot be performed during the period from when the vehicle power supply system transitions from an OFF state to an ON state up to when the estimation processing or the detection processing of determining or detecting whether the backup power supply is in a state in which the backup power supply is able to supply electric power to the specific important load is completed.

An object of the present invention is to provide a vehicle power supply system capable of outputting, in a short time, a signal indicating that a backup low-voltage power supply is in a state in which the backup low-voltage power supply can supply electric power for operating an emergency important load when the vehicle power supply system transitions from an OFF state to an ON state in a case where the backup low-voltage power supply is in a state in which the backup low-voltage power supply can supply electric power for operating the emergency important load.

SUMMARY OF INVENTION

According to an aspect of the present invention, there is provided a vehicle power supply system mounted on a vehicle. The vehicle power supply system includes: a main power supply system that is provided with a main low-voltage power supply and a normal load; and a backup power supply system that is provided with a backup low-voltage power supply and an emergency important load and is connected to the main power supply system. The backup power supply system is configured to supply electric power of the backup low-voltage power supply to the main power supply system. The backup power supply system includes: a switching device configured to switch a state of connection of the backup power supply system with the main power supply system between a connected state and a cut-off state, and a backup power supply controller that controls the switching device. The backup power supply controller is configured to: execute a backup low-voltage power supply state estimation processing of estimating whether the backup low-voltage power supply is in a state in which the backup low-voltage power supply is able to supply electric power for operating the emergency important load; output a signal indicating whether the backup low-voltage power supply is in a state in which the backup low-voltage power supply is able to supply electric power for operating the emergency important load, based on an estimation result of the backup low-voltage power supply state estimation processing; and execute the backup low-voltage power supply state estimation processing when the vehicle power supply system is turned off and a state of the vehicle satisfies a predetermined condition.

DESCRIPTION OF EMBODIMENTS

Hereinafter, an embodiment of a vehicle power supply system according to the present invention will be described with reference to the accompanying drawings.

[Overall Configuration of Vehicle Power Supply System]

Figure 1:
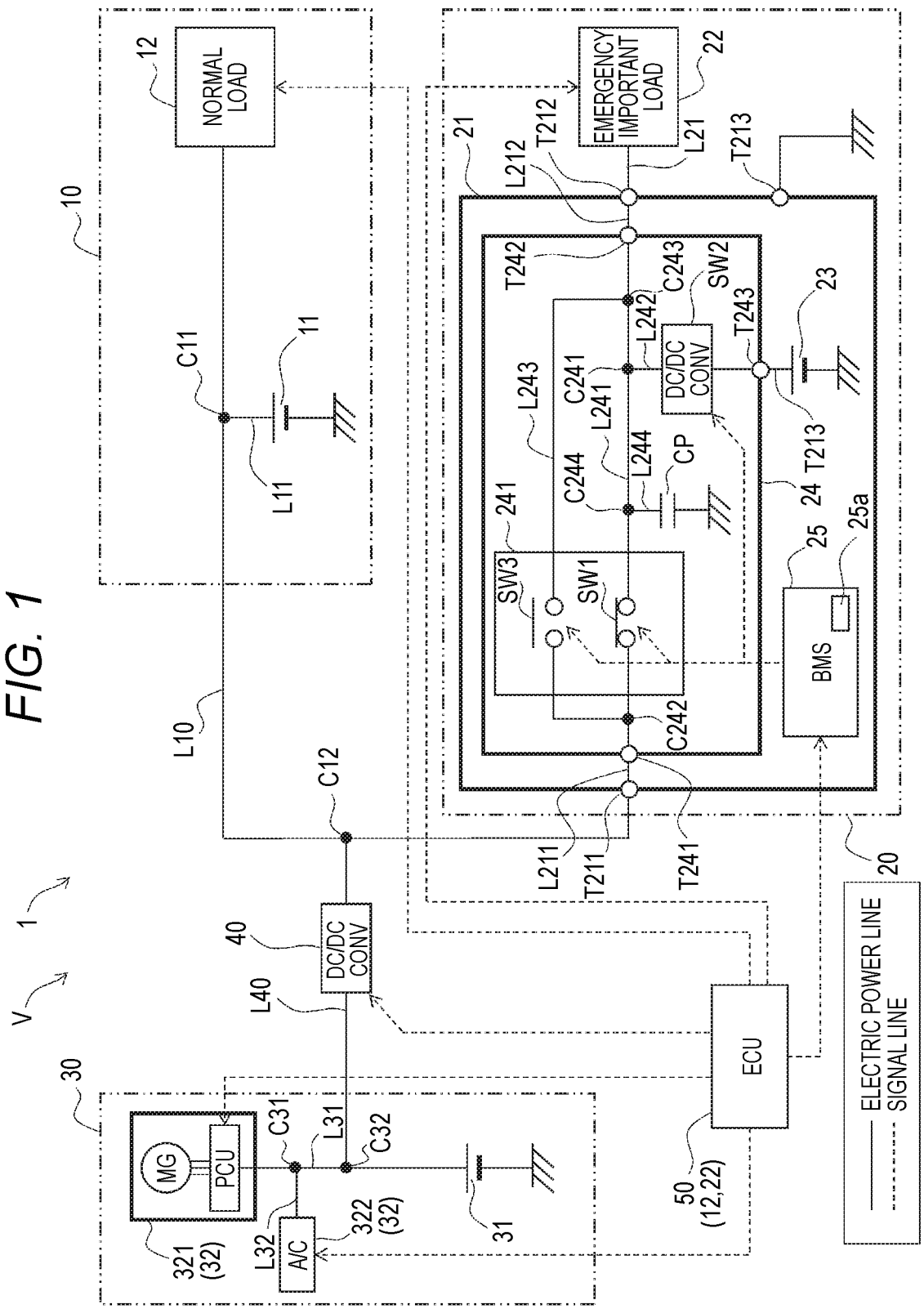
FIG. 1 is a schematic configuration diagram showing a vehicle power supply system according to an embodiment of the present invention.

As shown in FIG. 1, a vehicle power supply system 1 according to the present embodiment is mounted on a vehicle V. The vehicle power supply system 1 includes a main power supply system 10, a backup power supply system 20 connected to the main power supply system 10, a high-voltage power supply system 30, and a step-down device 40. The high-voltage power supply system 30 is connected to the main power supply system 10 and the backup power supply system 20 via the step-down device 40. The step-down device 40 steps down a voltage of electric power flowing through the high-voltage power supply system 30. The step-down device 40 is, for example, a DC-DC converter.

The vehicle V on which the vehicle power supply system 1 is mounted is mounted with a drive unit 321 including a rotary electric machine MG to be described later, and a high-voltage power supply 31 that supplies electric power for driving the drive unit 321. The vehicle V is a vehicle that can be driven by power of the rotary electric machine MG driven by the electric power of the high-voltage power supply 31. The vehicle V may be mounted with an internal combustion engine. The internal combustion engine may function as a power source that drives the vehicle V, or may function as a power source that drives a generator (not shown). That is, the vehicle V may be an electric vehicle that does not include an internal combustion engine, or may be a hybrid vehicle that includes an internal combustion engine and a rotary electric machine MG for driving the vehicle. In the present embodiment, the vehicle V is a vehicle capable of autonomous driving under a specific condition.

<Main Power Supply System>

The main power supply system 10 includes a main low-voltage power supply 11 and a normal load 12.

The main low-voltage power supply 11 is, for example, a secondary battery such as a lithium ion battery or a lead battery. The main low-voltage power supply 11 outputs electric power having a voltage of, for example, 12 [V].

The main low-voltage power supply 11 is provided on a connection line L11. One end portion of the connection line L11 is connected to a contact C11 formed on a connection line L10, and the other end portion of the connection line L11 is connected to a ground line having a reference potential of the vehicle power supply system 1. A positive electrode side of the main low-voltage power supply 11 is connected to the contact C11 side of the connection line L11, and a negative electrode side of the main low-voltage power supply 11 is connected to the ground line side of the connection line L11.

The normal load 12 includes a load having a function related to a traveling operation, a stopping operation, or a drive control of the vehicle V. The normal load 12 includes an electronic control unit (ECU) 50 capable of executing a drive control of the vehicle V. Further, the normal load 12 may include at least one of an auxiliary load used for braking the vehicle V, such as an automatic brake device, an auxiliary load used for steering the vehicle V, such as an automatic steering device, an auxiliary load used for acquiring external information of the vehicle V, such as light detection and ranging (LiDAR), a wiper device, a power window device, and measuring instruments.

The normal load 12 is connected to one end portion of the connection line L10.

<Backup Power Supply System>

The backup power supply system 20 includes a backup power supply unit 21 and an emergency important load 22.

The backup power supply unit 21 includes a backup low-voltage power supply 23, a switching device 24, and a backup power supply control device 25 that controls the switching device 24.

The backup power supply unit 21 includes a first external connection terminal T211, a second external connection terminal T212, and a ground terminal T213. The other end portion of the connection line L10 is connected to the first external connection terminal T211. The ground terminal T213 is connected to a ground line.

The emergency important load 22 includes a load having a function related to a traveling operation, a stopping operation, or a drive control of the vehicle V. The emergency important load 22 is a load having a function related to the execution of a minimal risk maneuver (MRM) that is a minimum necessary traveling operation, stopping operation, or drive control for safely moving the vehicle V to a road shoulder of a road and stopping the vehicle V even when a drive force of a drive source is lost. The emergency important load 22 includes the above-described ECU 50 capable of executing a drive control of the vehicle V. The emergency important load 22 may further include at least one of an auxiliary load used for braking the vehicle V, such as an automatic brake device, an auxiliary load used for steering the vehicle V, such as an automatic steering device, and an auxiliary load used for acquiring external information of the vehicle V, such as light detection and ranging (LiDAR).

The emergency important load 22 of the backup power supply system 20 and the normal load 12 of the main power supply system 10 may have some functions overlapping with each other. For example, the emergency important load 22 may be a load that overlaps with a part of the normal load 12 of the main power supply system 10. In this manner, the emergency important load 22 can be multiplexed and made redundant. In other words, the overlapping functions between the normal load 12 of the main power supply system 10 and the emergency important load 22 can be operated by the main power supply system 10 and can also be operated by the backup power supply system 20. As a result, the overlapping functions between the normal load 12 of the main power supply system 10 and the emergency important load 22 can be operated even when an abnormality occurs in the main power supply system 10, and can be operated even when an abnormality occurs in the backup power supply system 20.

The emergency important load 22 is connected to the second external connection terminal T212 of the backup power supply unit 21 by a connection line L21.

The switching device 24 includes a first terminal T241, a second terminal T242, and a third terminal T243. The first terminal T241 is connected to the first external connection terminal T211 of the backup power supply unit 21 by a connection line L211. The second terminal T242 is connected to the second external connection terminal T212 of the backup power supply unit 21 by a connection line L212.

The switching device 24 includes a connection line L241 that connects the first terminal T241 and the second terminal T242. The connection line L241 is provided with a first switch SW1. In the present embodiment, the first switch SW1 is a switch having a normally open (N.O.) contact. The normally open contact is a contact that maintains the first switch SW1 in an OFF state and maintains the connection line L241 in a cut-off state when an operation signal is not applied to the first switch SW1. Specifically, in the case of an electromagnetic switch (for example, an electromagnetic contactor or an electromagnetic switch) in which an operation force is an electromagnetic force, when an electromagnetic force caused by an operation current is not generated, the first switch SW1 is maintained in an OFF state and the connection line L241 is maintained in a cut-off state. The first switch SW1 is, for example, a semiconductor switch.

The switching device 24 includes a connection line L242 that connects the connection line L241 and the third terminal T243. One end portion of the connection line L242 is connected to the connection line L241 at a contact C241 formed between the first switch SW1 and the second terminal T242 on the connection line L241, and the other end portion of the connection line L242 is connected to the third terminal T243. The connection line L242 is provided with a second switch SW2. In the present embodiment, the second switch SW2 is a DC-DC converter. The second switch SW2 maintains the connection line L242 in a connected state when the second switch SW2 is in an ON state, and maintains the connection line L242 in a cut-off state when the second switch SW2 is in an OFF state. Further, since the second switch SW2 is a DC-DC converter, a voltage of electric power flowing through the connection line L242 can be stepped up or stepped down when the second switch SW2 is in an ON state. In this manner, the second switch SW2 can switch the connection line L242 between a connected state and a cut-off state, and can step up or step down the voltage of the electric power flowing through the connection line L242 when the connection line L242 is in the connected state.

The switching device 24 includes a connection line L243 connected in parallel with the connection line L241. One end portion of the connection line L243 is connected to a contact C242 formed between the first terminal T241 and the first switch SW1 on the connection line L241, and the other end portion of the connection line L243 is connected to a contact C243 formed between the contact C241 and the second terminal T242 on the connection line L241. The connection line L243 is provided with a third switch SW3. In the present embodiment, the third switch SW3 is a switch having a normally closed (N.C.) contact. The normally closed contact is a contact that maintains the third switch SW3 in an ON state and maintains the connection line L243 in a connected state when an operation signal is not applied to the third switch SW3. Specifically, in the case of an electromagnetic switch (for example, an electromagnetic contactor or an electromagnetic switch) in which an operation force is an electromagnetic force, when an electromagnetic force caused by an operation current is not generated, the third switch SW3 is maintained in an ON state and the connection line L243 is maintained in a connected state. The third switch SW3 is, for example, a semiconductor switch.

In this manner, the first switch SW1 having a normally open contact and the third switch SW3 having a normally closed contact are provided in parallel in the backup power supply system 20.

When at least one of the first switch SW1 and the third switch SW3 is in an ON state, the backup power supply system 20 is connected to the main power supply system 10, electric power of the backup low-voltage power supply 23 can be supplied to the main power supply system 10, and electric power can be supplied from the main power supply system 10 to the emergency important load 22. On the other hand, when both the first switch SW1 and the third switch SW3 are in an OFF state, connection between the backup power supply system 20 and the main power supply system 10 is cut off.

Therefore, even in a state in which electric power is not supplied to the backup power supply control device 25, electric power can be supplied from the main power supply system 10 to the emergency important load 22.

In the present embodiment, the first switch SW1 and the third switch SW3 are modularized as a switch module 241.

The switching device 24 includes a connection line L244 that connects the connection line L241 and a ground line. One end portion of the connection line L244 is connected to a contact C244 formed between the first switch SW1 and the contact C241 on the connection line L241, and the other end portion of the connection line L244 is connected to aground line. The connection line L244 is provided with a capacitor CP.

The backup low-voltage power supply 23 is, for example, a secondary battery such as a lithium ion battery. The backup low-voltage power supply 23 outputs electric power having a voltage of, for example, 12 [V].

The backup low-voltage power supply 23 is provided on a connection line L213. One end portion of the connection line L213 is connected to the third terminal T243 of the switching device 24, and the other end portion of the connection line L213 is connected to a ground line. The backup low-voltage power supply 23 is provided on the connection line L213 such that a positive electrode side is a third terminal T243 side of the switching device 24 and a negative electrode side is a ground line side.

Therefore, when the second switch SW2 is in an ON state, the backup low-voltage power supply 23 supplies electric power from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. On the other hand, when the second switch SW2 is in an OFF state, the connection line L242 of the switching device 24 is in a cut-off state, and thus electric power is not supplied from the backup low-voltage power supply 23 to the backup power supply system 20.

The backup power supply control device 25 includes a processor (not shown) such as a central processing unit (CPU) and a storage medium 25a such as a read only memory (ROM).

The backup power supply control device 25 is operated by, for example, electric power stored in the backup low-voltage power supply 23.

The backup power supply control device 25 controls the first switch SW1, the second switch SW2, and the third switch SW3 according to a program stored in the storage medium 25a. Specifically, the backup power supply control device 25 switches an ON state and an OFF state of the first switch SW1, the second switch SW2, and the third switch SW3. The backup power supply control device 25 is connected to the first switch SW1, the second switch SW2, and the third switch SW3 by signal lines. The backup power supply control device 25 transmits operation signals to the first switch SW1, the second switch SW2, and the third switch SW3 via the signal lines. The operation signals include signals for operating the first switch SW1, the second switch SW2, and the third switch SW3 to an ON state and an OFF state.

The backup power supply control device 25 can execute a backup low-voltage power supply state estimation processing of estimating whether the backup low-voltage power supply 23 is in a state in which the backup low-voltage power supply 23 can supply electric power for operating the emergency important load 22, according to a program stored in the storage medium 25a. The backup low-voltage power supply state estimation processing will be described in detail later. In addition, the backup power supply control device 25 can output a signal indicating whether the backup low-voltage power supply 23 is in a state in which the backup low-voltage power supply 23 can supply electric power for operating the emergency important load 22, based on an estimation result of the backup low-voltage power supply state estimation processing.

<High-Voltage Power Supply System>

The high-voltage power supply system 30 includes a high-voltage power supply 31 and a high-voltage load 32.

The high-voltage power supply 31 is, for example, a secondary battery such as a lithium ion battery. The high-voltage power supply 31 outputs electric power having a higher voltage than that of the main low-voltage power supply 11 and the backup low-voltage power supply 23. The high-voltage power supply 31 outputs electric power having a voltage of, for example, 200 [V].

The high-voltage power supply 31 is connected to a connection line L31. One end portion of the connection line L31 is connected to a ground line, and a negative electrode side of the high-voltage power supply 31 is connected to a ground line side of the connection line L31.

The high voltage load 32 is operated at a voltage higher than voltages of the normal load 12 and the emergency important load 22. In the present embodiment, the high-voltage load 32 includes the drive unit 321 that drives the vehicle V and an air conditioner 322 that adjusts a temperature inside a vehicle cabin of the vehicle V.

The drive unit 321 includes the rotary electric machine MG that generates power for driving the vehicle V, and a power control unit PCU that controls the rotary electric machine MG. The power control unit PCU includes a DC-DC converter, an inverter, and the like.

The drive unit 321 is connected to the other end portion of the connection line L31. The high-voltage power supply 31 can supply electric power to the drive unit 321. The drive unit 321 converts DC power supplied from the high-voltage power supply 31 into three-phase AC power in the power control unit PCU, and supplies the three-phase AC power to the rotary electric machine MG. Accordingly, the rotary electric machine MG uses the electric power of the high-voltage power supply 31 to generate power for driving the vehicle V. The drive unit 321 may generate three-phase AC power in the rotary electric machine MG during braking of the vehicle V and convert the three-phase AC power into DC power in the power control unit PCU to charge the high-voltage power supply 31.

The air conditioner 322 is connected to a connection line L32 connected to the connection line L31 at a contact C31 formed between the high-voltage power supply 31 and the drive unit 321 on the connection line L31. The air conditioner 322 is operated by the electric power of the high-voltage power supply 31.

<Step-Down Device>

The step-down device 40 is provided on a connection line L40. One end portion of the connection line L40 is connected to a contact C32 formed between the high-voltage power supply 31 and the contact C31 on the connection line L31, and the other end portion of the connection line L40 is connected to a contact C12 formed between the contact C11 on the connection line L10 and the other end portion of the connection line L10 (that is, the first external connection terminal T211 of the backup power supply unit 21 of the backup power supply system 20).

In this manner, the high-voltage power supply system 30 is connected to the main power supply system 10 and the backup power supply system 20 via the step-down device 40.

The step-down device 40 steps down a voltage of electric power flowing through the high-voltage power supply system 30. The step-down device 40 is, for example, a DC-DC converter. Therefore, a voltage of the electric power flowing through the high-voltage power supply system 30 is stepped down by the step-down device 40, and can be supplied to the main power supply system 10 and the backup power supply system 20.

Further, the step-down device 40 can be switched between a connected state and a cut-off state. When the step-down device 40 is in the connected state, the high-voltage power supply system 30 is connected to the main power supply system 10 and the backup power supply system 20 via the connection line L40 and the step-down device 40. When the step-down device 40 is in the cut-off state, the high-voltage power supply system 30 are cut off from the main power supply system 10 and the backup power supply system 20.

Therefore, the vehicle power supply system 1 can supply electric power from the high-voltage power supply system 30 to the normal load 12 of the main power supply system 10 and the emergency important load 22 of the backup power supply system 20 via the step-down device 40 even when storage power remaining amounts of the main low-voltage power supply 11 of the main power supply system 10 and the backup low-voltage power supply 23 of the backup power supply system 20 are depleted. As a result, the vehicle power supply system 1 can operate the normal load 12 of the main power supply system 10 and the emergency important load 22 of the backup power supply system 20 even when the storage power remaining amounts of the main low-voltage power supply 11 of the main power supply system 10 and the backup low-voltage power supply 23 of the backup power supply system 20 are depleted.

In addition, the vehicle power supply system 1 can charge the main low-voltage power supply 11 of the main power supply system 10 using electric power of the high-voltage power supply 31 of the high-voltage power supply system 30 via the step-down device 40. Accordingly, it is possible to prevent a storage power remaining amount of the main low-voltage power supply 11 of the main power supply system 10 from being depleted.

The vehicle power supply system 1 can charge the backup low-voltage power supply 23 of the backup power supply system 20 using the electric power of the high-voltage power supply 31 of the high-voltage power supply system 30 via the step-down device 40. Specifically, the backup power supply control device 25 controls at least one of the first switch SW1 and the third switch SW3 to be in an ON state and controls the second switch SW2 to be in an ON state, electric power of the high-voltage power supply 31 of the high-voltage power supply system 30 can be used to charge the backup low-voltage power supply 23 of the backup power supply system 20 via the step-down device 40. Accordingly, it is possible to prevent a storage power remaining amount of the backup low-voltage power supply 23 of the backup power supply system 20 from being depleted.

[Operation of Vehicle Power Supply System]

Next, an operation of the vehicle power supply system 1 will be described with reference to FIGS. 2 to 9.

In the present specification and the like, an ON state of the vehicle power supply system 1 refers to a state in which an ON operation is performed on the vehicle power supply system 1, a drive source of the vehicle V is activated, and electric power required for driving the vehicle V is supplied to auxiliary machines necessary for traveling, and refers to a state in which the vehicle V is traveling or a state in which the vehicle V can immediately travel. In the present embodiment, the ON state of the vehicle power supply system 1 refers to a state in which the drive unit 321 is activated and the normal load 12 and the emergency important load 22 are activated. The ON operation of the vehicle power supply system 1 refers to that, for example, an ON operation is performed on a power switch (not shown) provided in the vehicle V by an operator of the vehicle V. In a case where the vehicle V includes an internal combustion engine, the ON state of the vehicle power supply system 1 may refer to a state in which the internal combustion engine is activated and the normal load 12 and the emergency important load 22 are activated. In addition, in a case where the vehicle V includes an internal combustion engine, the ON operation of the vehicle power supply system 1 may refer to that an ON operation is performed on an ignition power supply switch or the like provided in the vehicle V by an operator of the vehicle V.

On the other hand, an OFF state of the vehicle power supply system 1 refers to a state in which an OFF operation is performed on the vehicle power supply system 1, a drive source of the vehicle V is not activated, and electric power required for driving the vehicle V is not supplied to auxiliary machines necessary for traveling. In the present embodiment, the OFF state of the vehicle power supply system 1 refers to a state in which the high-voltage load 32 including the drive unit 321 is not activated, the normal load 12 and the emergency important load 22 are not activated, and standby electric power is supplied to the normal load 12 and the emergency important load 22. The OFF operation of the vehicle power supply system 1 refers to that, for example, an OFF operation is performed on a power switch (not shown) provided in the vehicle V by an operator of the vehicle V. In a case where the vehicle V includes an internal combustion engine, the OFF state of the vehicle power supply system 1 may refer to a state in which the internal combustion engine is not activated, the normal load 12 and the emergency important load 22 are not activated, and standby electric power is supplied to the normal load 12 and the emergency important load 22. In addition, in a case where the vehicle V includes an internal combustion engine, the OFF operation of the vehicle power supply system 1 may refer to that an OFF operation is performed on an ignition power supply switch or the like provided in the vehicle V by an operator of the vehicle V.

An operation of the vehicle power supply system 1 to be described below is achieved by executing a program stored in advance in the backup power supply control device 25.

<Operation of Vehicle Power Supply System when Vehicle Power Supply System is in OFF State>

Figure 2:
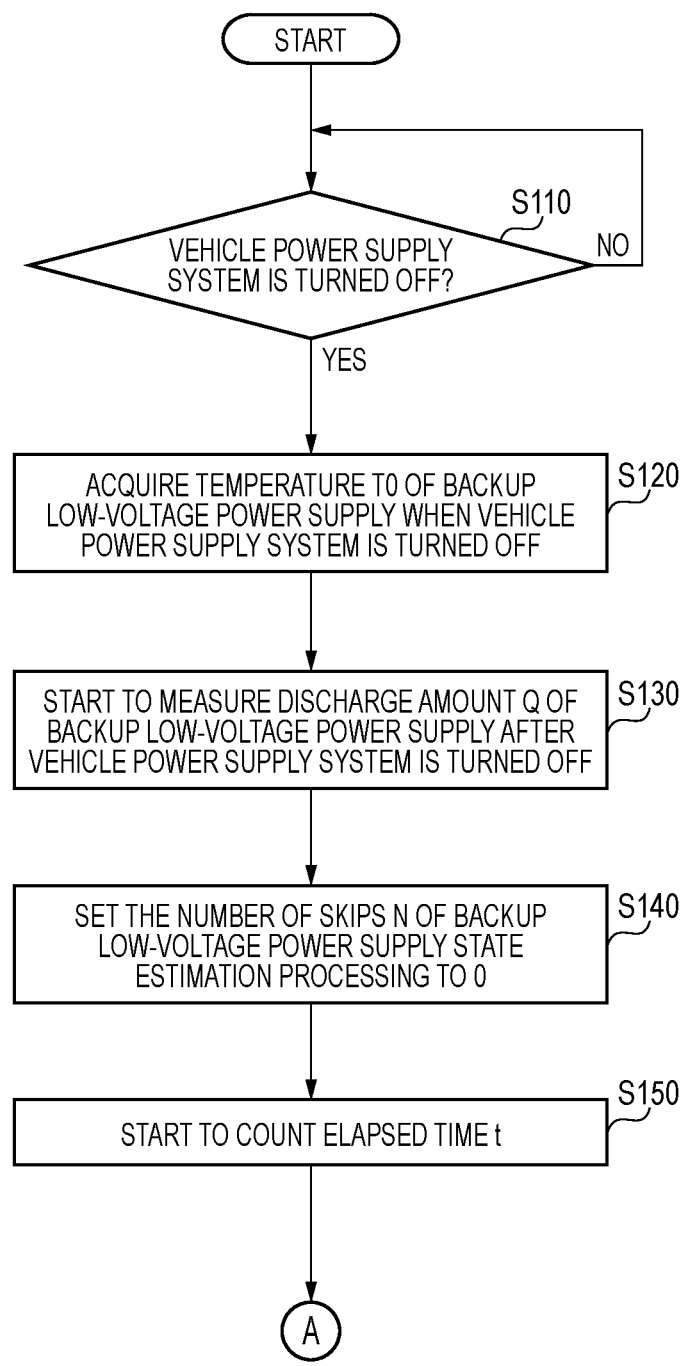
FIG. 2 is a flowchart (part 1) showing an example of an operation of the vehicle power supply system when the vehicle power supply system is turned off according to the embodiment of the present invention.

As shown in FIG. 2, first, it is determined whether the vehicle power supply system 1 is turned off in step S110. The vehicle power supply system 1 is in a standby state until the vehicle power supply system 1 is turned off (a loop of step S110: NO), and when the vehicle power supply system 1 is turned off (step S110: YES), the processing proceeds to step S120.

In step S120, a temperature T0 of the backup low-voltage power supply 23 when the vehicle power supply system 1 is turned off is acquired. Then, the processing proceeds to step S130.

In step S130, a measurement of a discharge amount Q of the backup low-voltage power supply 23 is started after the vehicle power supply system 1 is turned off. Then, the processing proceeds to step S140.

In step S140, the number of skips N of the backup low-voltage power supply state estimation processing is set to 0. Then, the processing proceeds to step S150.

In step S150, counting of an elapsed time t is started. Then, the processing proceeds to step S210 (see FIG. 3).

Figure 3:
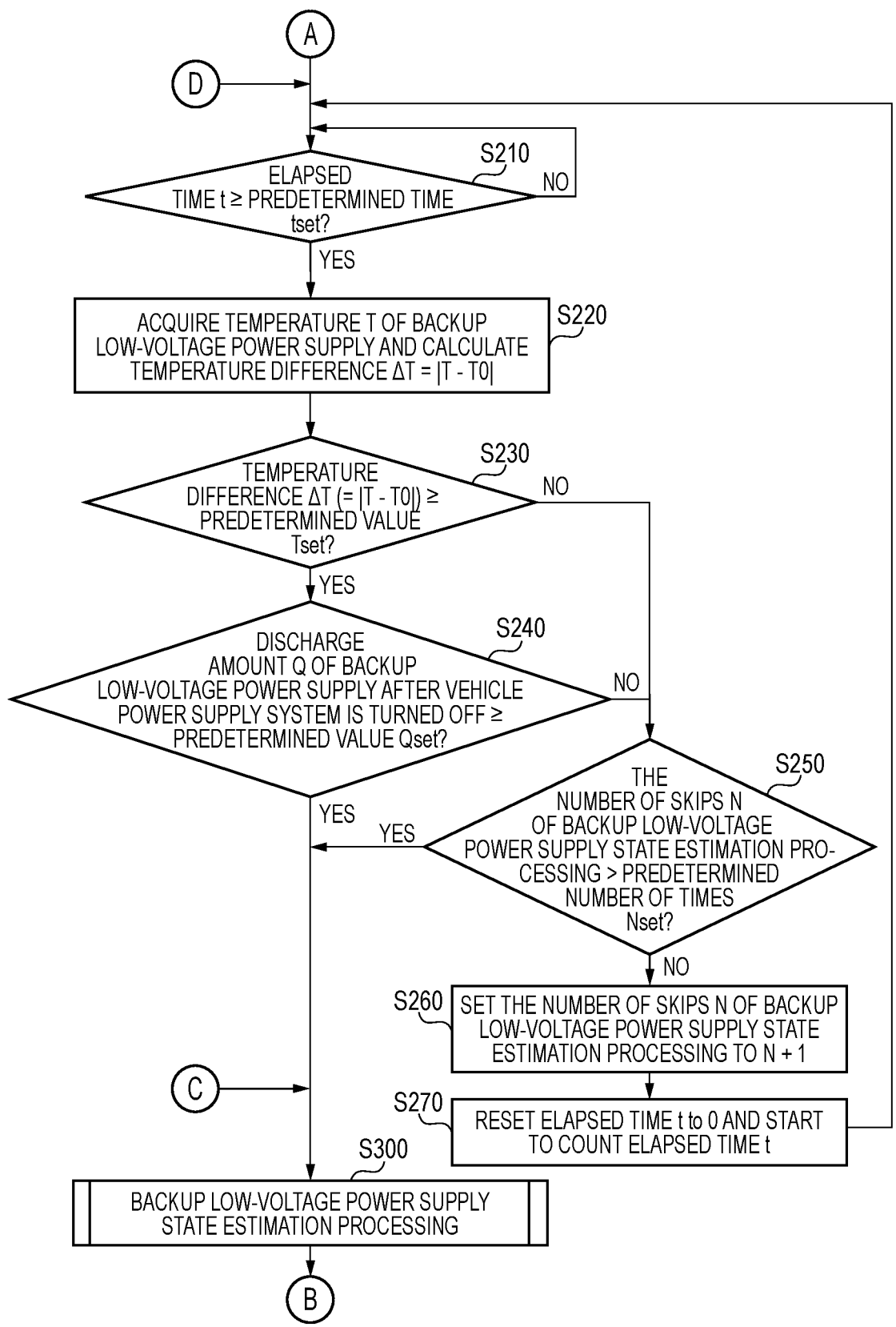
FIG. 3 is a flowchart (part 2) showing an example of an operation of the vehicle power supply system when the vehicle power supply system is turned off according to the embodiment of the present invention.
Figure 4:
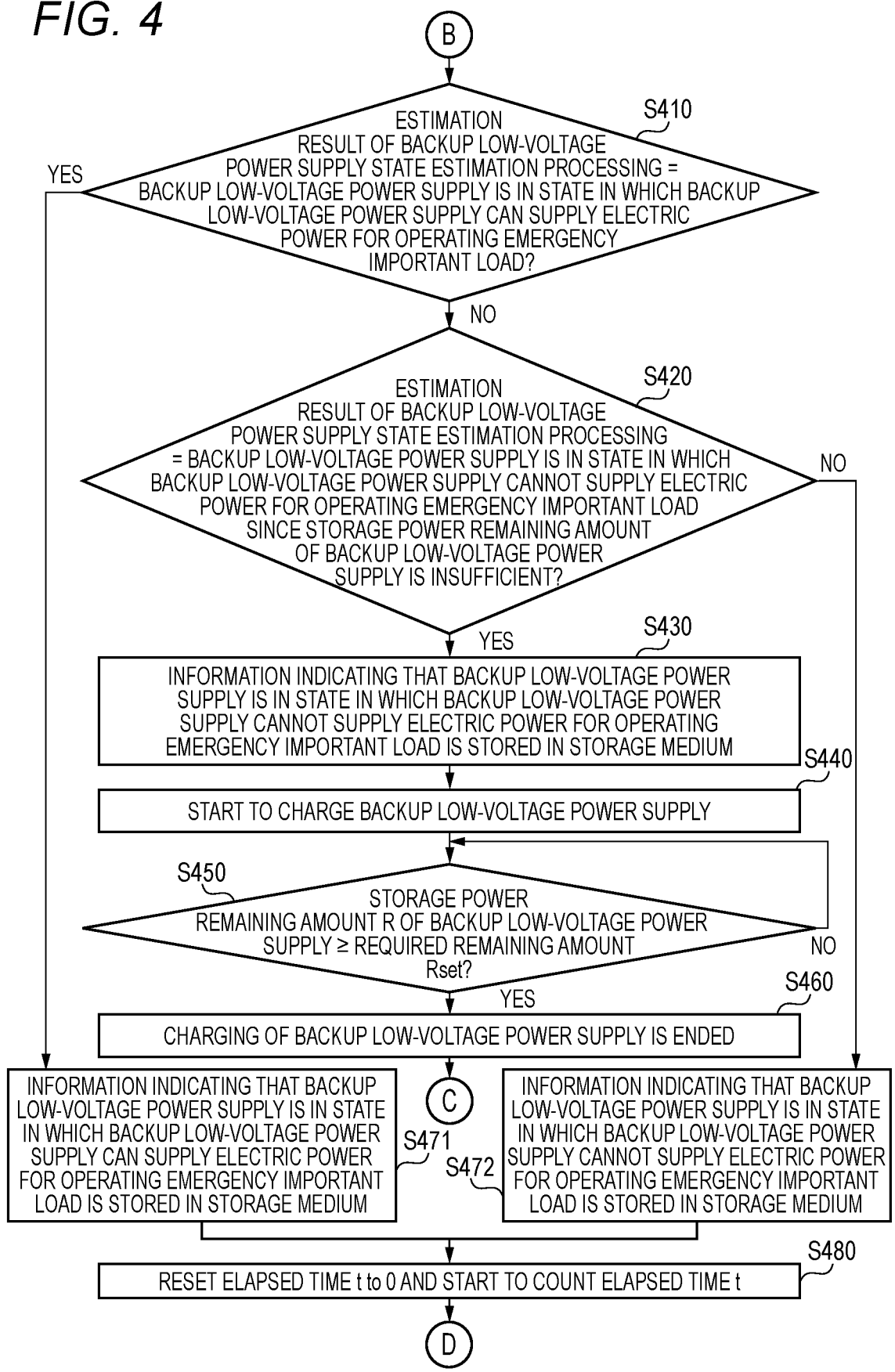
FIG. 4 is a flowchart (part 3) showing an example of an operation of the vehicle power supply system when the vehicle power supply system is turned off according to the embodiment of the present invention.

As shown in FIG. 3, it is determined in step S210 whether the elapsed time t from when the counting is started in step S150 is equal to or longer than a predetermined time tset. The predetermined time tset may be set in advance to any value such as 4 [hours], 12 [hours], 24 [hours], 120 [hours] (5 days), and 168 [hours] (1 week). Alternatively, for example, a time up to when the vehicle power supply system 1 is turned on next time is predicted by machine learning or the like based on a previous usage situation of the vehicle V, and the predicted time tset may be set based on the predicted time up to when the vehicle power supply system 1 is turned on next time. When the elapsed time t is not equal to or longer than the predetermined time tset, the vehicle power supply system 1 is brought into a standby state until the elapsed time t is equal to or longer than the predetermined time tset (a loop of step S210: NO), and when the elapsed time t is equal to or longer than the predetermined time tset, the processing proceeds to step S220 (step S210: YES).

In step S220, a temperature T of the backup low-voltage power supply 23 is acquired, and a temperature difference $\Delta T=|T-T0|$ is calculated between the acquired temperature T of the backup low-voltage power supply 23 and the temperature T0 of the backup low-voltage power supply 23 acquired in step S120 when the vehicle power supply system 1 is turned off most recently. Then, the processing proceeds to step S230.

In step S230, it is determined whether the temperature difference $\Delta T$ (=|T−T0|) acquired in step S220 is equal to or larger than a predetermined value Tset. When the temperature difference $\Delta T$ is equal to or larger than the predetermined value Tset (step S230: YES), the processing proceeds to step S240. When the temperature difference $\Delta T$ is not equal to or larger than the predetermined value Tset (step S230: NO), the processing proceeds to step S250.

In step S240, it is determined whether the discharge amount Q of the backup low-voltage power supply 23 that is started to be measured in step S130 after the vehicle power supply system 1 is turned off most recently is equal to or larger than a predetermined value Qset. When the discharge amount Q is equal to or larger than the predetermined value Qset (step S240: YES), the processing proceeds to step S300, and the backup power supply control device 25 executes a backup low-voltage power supply state estimation processing (see FIGS. 6 and 7) to be described later. When the discharge amount Q is not equal to or larger than the predetermined value Qset (step S240: NO), the processing proceeds to step S250.

In step S250, it is determined whether the number of skips N [times] of the backup low-voltage power supply state estimation processing exceeds a predetermined number of times Nset [times]. The predetermined number of times Nset [times] can be set to any number, and is, for example, 3 [times], 5 [times], or the like. When the number of skips N [times] of the backup low-voltage power supply state estimation processing exceeds the predetermined number of times Nset [times] (step S250: YES), the processing proceeds to step S300, and the backup power supply control device 25 executes the backup low-voltage power supply state estimation processing (see FIGS. 6 and 7) to be described later. When the number of skips N [times] of the backup low-voltage power supply state estimation processing does not exceed the predetermined number of times Nset [times] (step S250: NO), the backup low-voltage power supply state estimation processing is not executed, and the processing proceeds to step S260. Therefore, when the OFF state of the vehicle power supply system 1 continues for a long period of time, the backup low-voltage power supply state estimation processing is executed regardless of the values of the temperature difference ΔT and the discharge amount Q each time (predetermined time tset)×(predetermined number of times Nset [times]) elapses. As a result, when the OFF state of the vehicle power supply system 1 continues for a long period of time, whether the backup low-voltage power supply 23 is in a state in which the backup low-voltage power supply 23 can supply electric power for operating the emergency important load 22 can be confirmed by performing an estimation at a regular interval regardless of the values of the temperature difference ΔT and the discharge amount Q.

In step S260, the number of skips N [times] of the backup low-voltage power supply state estimation processing is added by 1 and is set to N+1 [times]. Then, the processing proceeds to step S270.

In step S270, the elapsed time t is reset to 0, and counting of the elapsed time t is started again. Then, the processing returns to step S210.

As described above, when the vehicle power supply system 1 is turned off and a state of the vehicle V satisfies a predetermined condition, the backup low-voltage power supply state estimation processing is executed, and when the state of the vehicle V does not satisfy the predetermined condition, the backup low-voltage power supply state estimation processing is not executed, that is, skipped, and the processing returns to step S210.

(Backup Low-Voltage Power Supply State Estimation Processing)

Here, an example of the backup low-voltage power supply state estimation processing will be described with reference to FIGS. 6 and 7.

Figure 6:
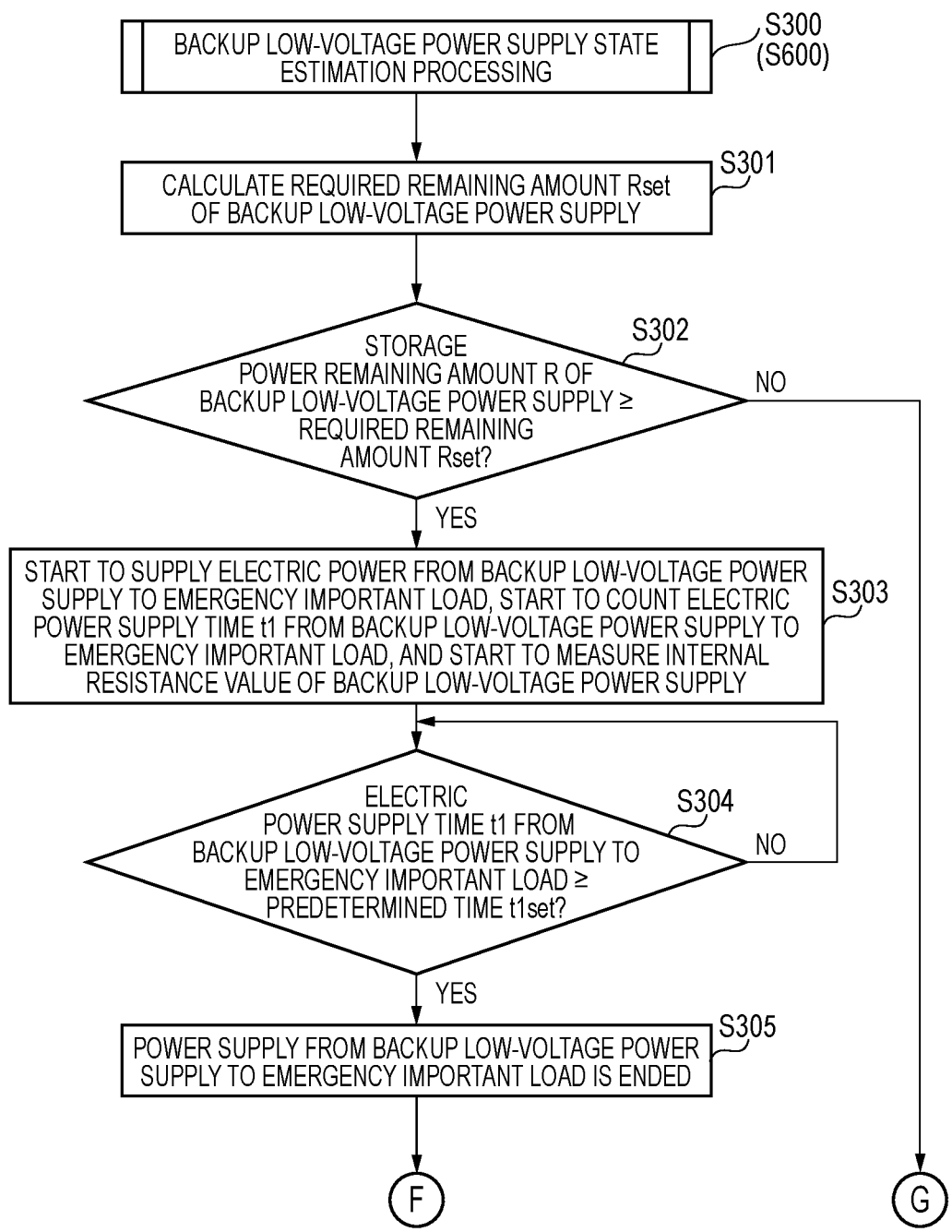
FIG. 6 is a flowchart (part 1) showing an example of a backup low-voltage power supply state estimation processing in the vehicle power supply system according to the embodiment of the present invention.
Figure 7:
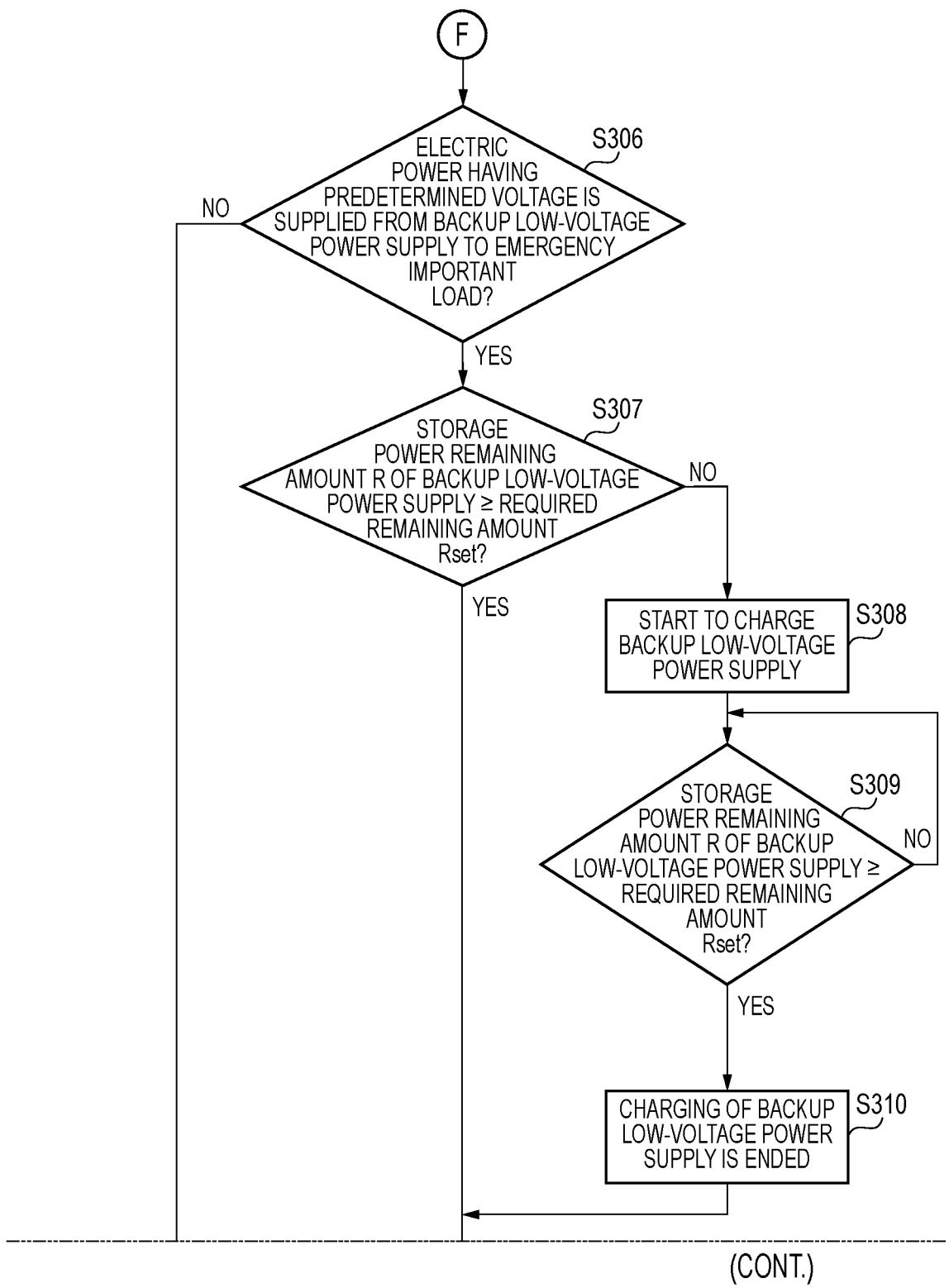
FIG. 7 is a flowchart (part 2) showing an example of the backup low-voltage power supply state estimation processing in the vehicle power supply system according to the embodiment of the present invention.

As shown in FIGS. 6 and 7, when the backup low-voltage power supply state estimation processing is started in step S300, the processing proceeds to step S301, and a required remaining amount Rset of the backup low-voltage power supply 23 is calculated. The required remaining amount Rset calculated when the vehicle power supply system 1 is tuned off, that is, the required remaining amount Rset calculated in the backup low-voltage power supply state estimation processing in S300 is an electric power capacity required for the backup low-voltage power supply 23 to operate the emergency important load 22 after (predetermined time tset)–(elapsed time t) elapses after a time point when the required remaining amount Rset is calculated. The required remaining amount Rset is calculated based on the temperature T of the backup low-voltage power supply 23 acquired in step S220 and the discharge amount Q of the backup low-voltage power supply 23 that is started to be measured in step S130 after the vehicle power supply system 1 is turned off. Then, the processing proceeds to step S302.

In step S302, it is determined whether a storage power remaining amount R of the backup low-voltage power supply 23 is equal to or larger than the required remaining amount Rset calculated in step S301. For example, an open circuit voltage (OCV) of the backup low-voltage power supply 23 is measured, and the storage power remaining amount R of the backup low-voltage power supply 23 is calculated based on the measured open circuit voltage of the backup low-voltage power supply 23. When the storage power remaining amount R of the backup low-voltage power supply 23 is equal to or larger than the required remaining amount Rset (step S302. YES), the processing proceeds to step S303. When the storage power remaining amount R of the backup low-voltage power supply 23 is not equal to or larger than the required remaining amount Rset calculated in step S301 (step S302: NO), the processing proceeds to step S323, and the backup low-voltage power supply state estimation processing is ended with an estimation result of the backup low-voltage power supply state estimation processing being "the backup low-voltage power supply is in a state in which the backup low-voltage power supply 23 cannot supply electric power for operating the emergency important load 22 since the storage power remaining amount of the backup low-voltage power supply 23 is insufficient".

In step S303, power supply from the backup low-voltage power supply 23 to the emergency important load 22 is started, and counting of an electric power supply time t1 from the backup low-voltage power supply 23 to the emergency important load 22 is started. Further, in step S303, a measurement of an internal resistance value of the backup low-voltage power supply 23 is started. Then, the processing proceeds to step S304.

In step S304, it is determined whether a predetermined time t1set is elapsed after the start of the power supply from the backup low-voltage power supply 23 to the emergency important load 22 in step S303, that is, whether the electric power supply time t1 from the backup low-voltage power supply 23 to the emergency important load 22 that is started to be counted in step S303 is equal to or longer than the predetermined time t1set. The predetermined time t1set is set based on, for example, a total time of a time required to determine whether an abnormality occurs in the main power supply system 10, a time required to execute a driver change request when an abnormality occurs in the main power supply system 10, and a time required to execute a minimal risk maneuver (MRM) that is a minimum necessary traveling operation, stopping operation, and drive control for safely moving the vehicle V to a road shoulder of a road and stopping the vehicle V. For example, the predetermined time t1set is freely set to a time of about 20 [seconds] to 60 [seconds]. When the electric power supply time t1 from the backup low-voltage power supply 23 to the emergency important load 22 is not equal to or longer than the predetermined time t1set, the power supply from the backup low-voltage power supply 23 to the emergency important load 22 is continued until the electric power supply time t1 from the backup low-voltage power supply 23 to the emergency important load 22 becomes equal to or longer than the predetermined time t1set (a loop of step S304: NO). When the electric power supply time t1 from the backup low-voltage power supply 23 to the emergency important load 22 becomes the predetermined time t1set (step S304: YES), the processing proceeds to step S305.

In step S305, the power supply from the backup low-voltage power supply 23 to the emergency important load 22, which is started in step S303, is ended. Then, the processing proceeds to step S306.

In step S306, it is determined whether electric power having a predetermined voltage is supplied from the backup low-voltage power supply 23 to the emergency important load 22 during a period from step S303 to step S305, that is, during the predetermined time t1set from the start of the power supply from the backup low-voltage power supply 23 to the emergency important load 22 in step S303. When electric power having a predetermined voltage is supplied from the backup low-voltage power supply 23 to the emergency important load 22 (step S306: YES), the processing proceeds to step S307. When electric power having a predetermined voltage is not supplied from the backup low-voltage power supply 23 to the emergency important load 22 (step S306: NO), the processing proceeds to step S322, the backup low-voltage power supply state estimation processing is ended with an estimation result of the backup low-voltage power supply state estimation processing being "the backup low-voltage power supply 23 is in a state in which the backup low-voltage power supply 23 cannot supply electric power for operating the emergency important load 22 since performance of the backup low-voltage power supply 23 is low".

As described above, in the present embodiment, during the predetermined time t1set set based on the total time of the time required to determine whether an abnormality occurs in the main power supply system 10, the time required to execute the driver change request when an abnormality occurs in the main power supply system 10, and the time required to execute the minimal risk maneuver (MRM), electric power is actually supplied from the backup low-voltage power supply 23 to the emergency important load 22 and it is determined whether electric power having a predetermined voltage is supplied from the backup low-voltage power supply 23 to the emergency important load 22. As a result, in a case where an abnormality occurred in the main power supply system 10, it is possible to more accurately determine whether the backup low-voltage power supply 23 can continuously supply electric power having a predetermined voltage to the emergency important load 22 in a period of time during which it is determined whether an abnormality occurs in the main power supply system 10, a driver change request is performed when an abnormality occurs in the main power supply system 10, and the minimal risk maneuver (MRM) is completed.

In step S307, it is determined whether the storage power remaining amount R of the backup low-voltage power supply 23 is equal to or larger than the required remaining amount Rset acquired in step S301. The storage power remaining amount R of the backup low-voltage power supply 23 is lowered due to the power supply from the backup low-voltage power supply 23 to the emergency important load 22 in the period from step S303 to step S305. Therefore, even when it is determined in step S302 that the storage power remaining amount R of the backup low-voltage power supply 23 is equal to or larger than the required remaining amount Rset acquired in step S301, in step S307, the storage power remaining amount R of the backup low-voltage power supply 23 may be less than the required remaining amount Rset acquired in step S301. When the storage power remaining amount R of the backup low-voltage power supply 23 is equal to or larger than the required remaining amount Rset acquired in step S301 (step S307: YES), the processing proceeds to step S311. When the storage power remaining amount R of the backup low-voltage power supply 23 is not equal to or larger than the required remaining amount Rset acquired in step S301, the processing proceeds to step S308.

In step S308, charging of the backup low-voltage power supply 23 is started. The electric power used to charge the backup low-voltage power supply 23 is supplied from at least one of the high-voltage power supply 31 and the main low-voltage power supply 11. Then, the processing proceeds to step S309.

Similar to step S307, it is determined in step S309 whether the storage power remaining amount R of the backup low-voltage power supply 23 is equal to or larger than the required remaining amount Rset acquired in step S301. When the storage power remaining amount R of the backup low-voltage power supply 23 is not equal to or larger than the required remaining amount Rset acquired in step S301, the charging of the backup low-voltage power supply 23 is continued until the storage power remaining amount R of the backup low-voltage power supply 23 becomes equal to or larger than the required remaining amount Rset acquired in step S301 (a loop of step S309: NO). When the storage power remaining amount R of the backup low-voltage power supply 23 is equal to or larger than the required remaining amount Rset acquired in step S301 (step S309: YES), the processing proceeds to step S310, and the charging of the backup low-voltage power supply 23 is ended. Then, the processing proceeds to step S311.

By executing the processing from step S308 to step S310, the storage power remaining amount R of the backup low-voltage power supply 23 can be returned to a level equal to or larger than the required remaining amount Rset acquired in step S301 even when the backup low-voltage power supply 23 consumes electric power during the period from step S303 to step S305, that is, during the predetermined time t1set from the start of the power supply from the backup low-voltage power supply 23 to the emergency important load 22 in step S303 and the storage power remaining amount R of the backup low-voltage power supply 23 is less than the required remaining amount Rset acquired in step S301.

In step S311, the measurement of the internal resistance value of the backup low-voltage power supply 23 that is started in step S303 is ended. After step S311, the processing proceeds to step S312.

In step S312, an internal impedance Z of the backup low-voltage power supply 23 is calculated based on the internal resistance value of the backup low-voltage power supply 23 measured in a period from the start of the power supply from the backup low-voltage power supply 23 to the emergency important load 22 in step S303 up to the end of the measurement of the internal resistance value of the backup low-voltage power supply 23 in step S311. Then, the processing proceeds to step S313.

In step S313, based on the internal impedance Z of the backup low-voltage power supply 23 calculated in step S312, it is determined whether electric power supplied from the backup low-voltage power supply 23 to the emergency important load 22 satisfies a current value required for operating the emergency important load 22 during the period from step S303 to step S305, that is, during the predetermined time t1set from the start of the power supply from the backup low-voltage power supply 23 to the emergency important load 22 in step S303. For example, when the internal impedance Z of the backup low-voltage power supply 23 is large, even when electric power having a predetermined voltage is supplied from the backup low-voltage power supply 23 to the emergency important load 22, a current supplied from the backup low-voltage power supply 23 to the emergency important load 22 is small, and a current required for operating the emergency important load 22 may not be supplied. In step S313, based on the internal impedance Z of the backup low-voltage power supply 23 calculated in step S312, it is determined whether electric power supplied from the backup low-voltage power supply 23 to the emergency important load 22 satisfies a current value required for operating the emergency important load 22 during the period from step S303 to step S305, that is, during the predetermined time t1set from the start of the power supply from the backup low-voltage power supply 23 to the emergency important load 22 in step S303, so that when an abnormality occurs in the main power supply system 10, it is possible to more accurately determine whether the emergency important load 22 can be operated using the electric power supplied from the backup low-voltage power supply 23 to the emergency important load 22.

Based on the internal impedance Z of the backup low-voltage power supply 23 calculated in step S312, when it is determined in step S313 that the required current from the backup low-voltage power supply 23 to the emergency important load 22 is supplied (step S313: YES) during the period from step S303 to step S305, that is, during the predetermined time t1set from the start of the power supply from the backup low-voltage power supply 23 to the emergency important load 22 in step S303, the processing proceeds to step S321, and the backup low-voltage power supply state estimation processing is ended with an estimation result of the backup low-voltage power supply state estimation processing being "the backup low-voltage power supply 23 is in a state in which the backup low-voltage power supply 23 can supply electric power for operating the emergency important load 22".

Based on the internal impedance Z of the backup low-voltage power supply 23 calculated in step S312, when it is determined in step S313 that the required current from the backup low-voltage power supply 23 to the emergency important load 22 is not supplied (step S313: NO) during the period from step S303 to step S305, that is, during the predetermined time t1set from the start of the power supply from the backup low-voltage power supply 23 to the emergency important load 22 in step S303, the processing proceeds to step S322, and the backup low-voltage power supply state estimation processing is ended with an estimation result of the backup low-voltage power supply state estimation processing being "the backup low-voltage power supply 23 is in a state in which the backup low-voltage power supply 23 cannot supply electric power for operating the emergency important load 22 since performance of the backup low-voltage power supply 23 is low".

As a result, a series of processings of the backup low-voltage power supply state estimation processing is ended.

Returning to FIG. 4, when the backup low-voltage power supply state estimation processing in step S300 is completed, the processing proceeds to step S410.

In step S410, it is determined whether the estimation result of the backup low-voltage power supply state estimation processing in step S300 is an estimation result indicating that the backup low-voltage power supply 23 is in a state in which the backup low-voltage power supply 23 can supply electric power for operating the emergency important load 22. When the estimation result of the backup low-voltage power supply state estimation processing in step S300 is an estimation result indicating that "the backup low-voltage power supply 23 is in a state in which the backup low-voltage power supply 23 can supply electric power for operating the emergency important load 22" (step S410: YES), the processing proceeds to step S471. When the estimation result of the backup low-voltage power supply state estimation processing in step S300 is an estimation result indicating that "the backup low-voltage power supply 23 is not in a state in which the backup low-voltage power supply 23 can supply electric power for operating the emergency important load 22" (step S410: NO), the processing proceeds to step S420.

In step S420, it is determined whether the estimation result of the backup low-voltage power supply state estimation processing in step S300 is an estimation result indicating that "the backup low-voltage power supply 23 is in a state in which the backup low-voltage power supply 23 cannot supply electric power for operating the emergency important load 22 since a storage power remaining amount of the backup low-voltage power supply 23 is insufficient". When the estimation result of the backup low-voltage power supply state estimation processing in step S300 is an estimation result indicating that "the backup low-voltage power supply 23 is in a state in which the backup low-voltage power supply 23 cannot supply electric power for operating the emergency important load 22 since the storage power remaining amount of the backup low-voltage power supply 23 is insufficient" (step S420: YES), the processing proceeds to step S430. When the estimation result of the backup low-voltage power supply state estimation processing in step S300 is not an estimation result indicating that "the backup low-voltage power supply 23 is in a state of in which the backup low-voltage power supply 23 cannot supply electric power for operating the emergency important load 22 since the storage power remaining amount of the backup low-voltage power supply 23 is insufficient" (step S420: NO), that is, when the estimation result of the backup low-voltage power supply state estimation processing in step S300 is an estimation result indicating that "the backup low-voltage power supply 23 is in a state in which the backup low-voltage power supply 23 cannot supply electric power for operating the emergency important load 22 since the performance of the backup low-voltage power supply 23 is low", the processing proceeds to step S472.

In step S430, information indicating that "the backup low-voltage power supply 23 is in a state in which the backup low-voltage power supply 23 cannot supply electric power for operating the emergency important load 22" is stored in the storage medium 25a. Then, the processing proceeds to step S440.

In step S440, charging of the backup low-voltage power supply 23 is started. The electric power used to charge the backup low-voltage power supply 23 is supplied from at least one of the high-voltage power supply 31 and the main low-voltage power supply 11. Then, the processing proceeds to step S450.

In step S450, it is determined whether the storage power remaining amount R of the backup low-voltage power supply 23 is equal to or larger than the required remaining amount Rset acquired in step S301. When the storage power remaining amount R of the backup low-voltage power supply 23 is not equal to or larger than the required remaining amount Rset acquired in step S301, the charging of the backup low-voltage power supply 23 is continued until the storage power remaining amount R of the backup low-voltage power supply 23 becomes equal to or larger than the required remaining amount Rset acquired in step S301 (a loop of step S450: NO).

When the storage power remaining amount R of the backup low-voltage power supply 23 is equal to or larger than the required remaining amount Rset acquired in step S301 (step S450: YES), the processing proceeds to step S460, and the charging of the backup low-voltage power supply 23 is ended. Then, the processing returns to step S300, and the backup low-voltage power supply state estimation processing is executed again. At this time, since the storage power remaining amount R of the backup low-voltage power supply 23 becomes equal to or larger than the required remaining amount Rset acquired in step S301 by executing the processing from step S440 to step S460, the storage power remaining amount R of the backup low-voltage power supply 23 is equal to or larger than the required remaining amount Rset in step S302 (step S302: YES), and the processing proceeds to step S303. Therefore, the estimation result of the backup low-voltage power supply state estimation processing in step S300 is either "the backup low-voltage power supply 23 is in a state in which the backup low-voltage power supply 23 can supply electric power for operating the emergency important load 22" (step S321) or "the backup low-voltage power supply 23 is in a state in which the backup low-voltage power supply 23 cannot supply electric power for operating the emergency important load 22 since the performance of the backup low-voltage power supply 23 is low" (step S322).

In step S471, information indicating that "the backup low-voltage power supply 23 is in a state in which the backup low-voltage power supply 23 can supply electric power for operating the emergency important load 22" is stored in the storage medium 25a, and the processing proceeds to step S480.

In step S472, information indicating that "the backup low-voltage power supply 23 is in a state in which the backup low-voltage power supply 23 cannot supply electric power for operating the emergency important load 22" is stored in the storage medium 25a. Then, the processing proceeds to step S480.

In step S471, step S472, and step S430, when information indicating whether the backup low-voltage power supply 23 is in a state in which the backup low-voltage power supply 23 can supply power for operating the emergency important load 22 is stored in the storage medium 25a by executing the previous series of processings, the information stored in the previous series of processings is rewritten, overwritten and stored in the storage medium 25a.

In step S480, the elapsed time t is reset to 0, and counting of the elapsed time t is started again. Then, the processing returns to step S210.

When the vehicle power supply system 1 is turned off, the vehicle power supply system 1 repeats the series of processings from step S110 to step S480.

<Operation of Vehicle Power Supply System when Vehicle Power Supply System Transitions from OFF State to ON State>

Figure 5:
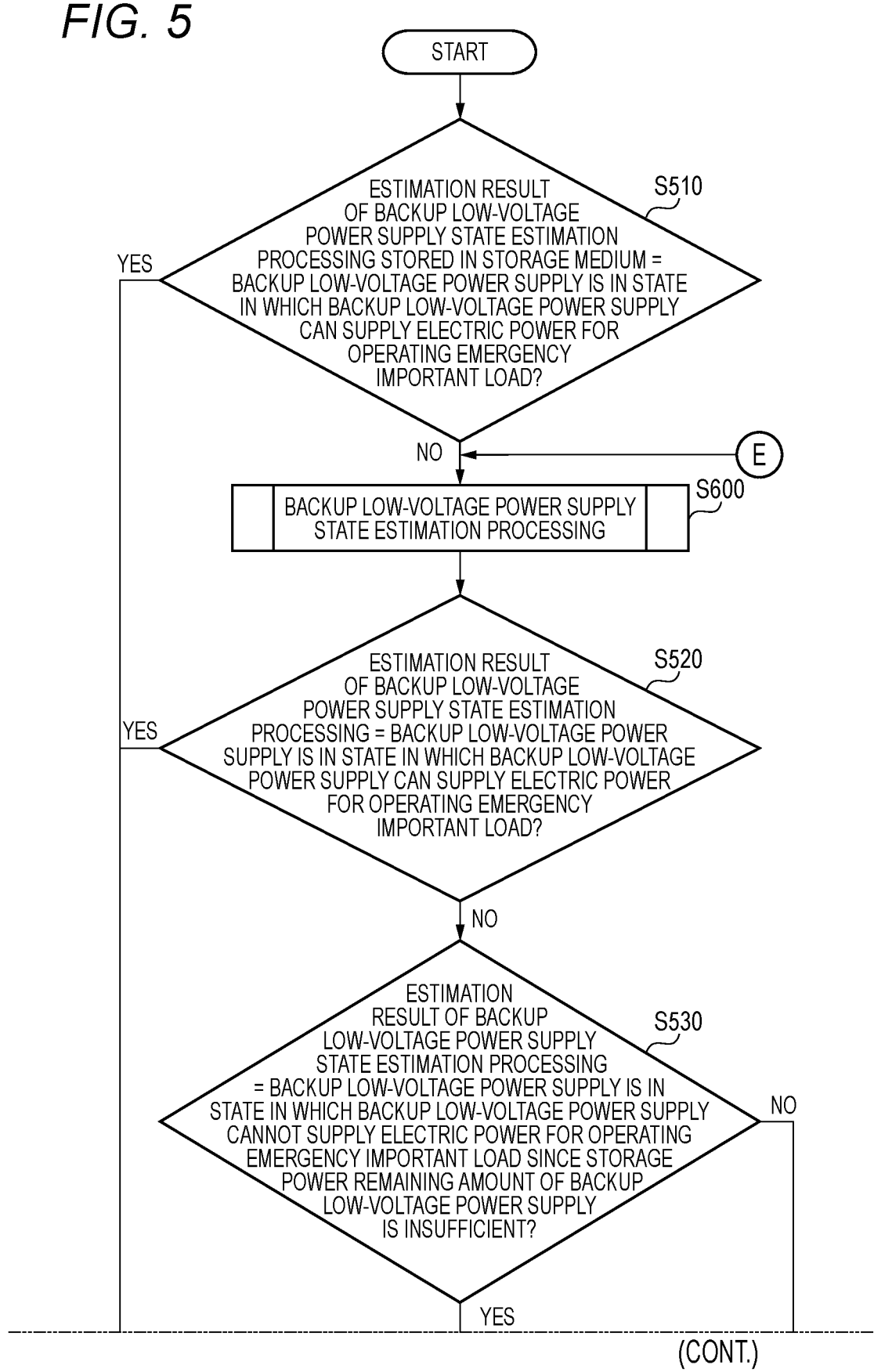
FIG. 5 is a flowchart showing an example of an operation of the vehicle power supply system when the vehicle power supply system transitions from an OFF state to an ON state according to the embodiment of the present invention.

As shown in FIG. 5, when the vehicle power supply system 1 is turned on after the vehicle power supply system 1 is turned off, the series of processings from step S110 to step S480 described above is ended, and the processing proceeds to step S510.

In step S510, the information that is stored in the storage medium 25a and indicates whether the backup low-voltage power supply 23 is in a state in which the backup low-voltage power supply 23 can supply electric power for operating the emergency important load 22 is called out, and it is determined whether the information stored in the storage medium 25a is information indicating that "the backup low-voltage power supply 23 is in a state in which the backup low-voltage power supply 23 can supply electric power for operating the emergency important load 22". After the determination, the information that is stored in the storage medium 25a and indicates whether the backup low-voltage power supply 23 is in a state in which the backup low-voltage power supply 23 can supply electric power for operating the emergency important load 22 is deleted.

When the information stored in the storage medium 25a is information indicating that "the backup low-voltage power supply 23 is in a state in which the backup low-voltage power supply 23 can supply electric power for operating the emergency important load 22" (step S510: YES), the processing proceeds to step S581, and the backup power supply control device 25 outputs a signal indicating that "the backup low-voltage power supply 23 is in a state in which the backup low-voltage power supply 23 can supply electric power for operating the emergency important load 22" to the ECU 50, and ends the series of processings.

As described above, when the vehicle power supply system 1 is turned off and a state of the vehicle V satisfies a predetermined condition, the backup low-voltage power supply state estimation processing is executed, and it is estimated whether the backup low-voltage power supply 23 is in a state in which the backup low-voltage power supply 23 can supply electric power for operating the emergency important load 22, so that the backup power supply control device 25 can omit the backup low-voltage power supply state estimation processing when the vehicle power supply system 1 transitions from an OFF state to an ON state in a case where the backup low-voltage power supply 23 is in a state in which the backup low-voltage power supply 23 can supply electric power for operating the emergency important load 22. As a result, in a case where the backup low-voltage power supply 23 is in a state in which the backup low-voltage power supply 23 can supply electric power for operating the emergency important load 22, the backup power supply control device 25 can output a signal indicating that the backup low-voltage power supply 23 is in a state in which the backup low-voltage power supply 23 can supply electric power for operating the emergency important load 22 to the ECU 50 in a short time when the vehicle power supply system 1 transitions from an OFF state to an ON state.

Since the backup low-voltage power supply state estimation processing is executed when the predetermined condition that the elapsed time t from the most recent OFF operation of the vehicle power supply system 1 is equal to or longer than the predetermined time tset is satisfied, it is possible to execute the backup low-voltage power supply state estimation processing when a probability that the storage power remaining amount R of the backup low-voltage power supply 23 is reduced due to standby electric power of the normal load 12 and the emergency important load 22 or the like and the backup low-voltage power supply 23 is in a state in which the backup low-voltage power supply 23 cannot supply electric power for operating the emergency important load 22 is high, while reducing power consumption when the vehicle power supply system 1 is in an OFF state.

Further, since the backup low-voltage power supply state estimation processing is executed when the predetermined condition that the temperature difference ΔT=|T−T0| between the temperature T of the backup low-voltage power supply 23 and the temperature T0 of the backup low-voltage power supply 23 when the vehicle power supply system 1 is turned off most recently is equal to or larger than the predetermined value Tset is satisfied, the backup low-voltage power supply state estimation processing can be executed when the temperature T of the backup low-voltage power supply 23 rapidly decreases or increases after the vehicle power supply system 1 is turned off most recently and a probability that the backup low-voltage power supply 23 is in a state in which the backup low-voltage power supply 23 cannot supply electric power for operating the emergency important load 22 is high, and the backup low-voltage power supply state estimation processing can be prevented from being executed when the probability that the backup low-voltage power supply 23 in a state in which the backup low-voltage power supply 23 cannot supply electric power for operating the emergency important load 22 is low. Therefore, it is possible to reduce power consumption when the vehicle power supply system 1 is in an OFF state.

Since the backup low-voltage power supply state estimation processing is executed when the predetermined condition that the discharge amount Q of the backup low-voltage power supply 23 after the vehicle power supply system 1 is turned off most recently is equal to or larger than the predetermined value Qset is satisfied, the backup low-voltage power supply state estimation processing can be executed when the discharge amount Q of the backup low-voltage power supply 23 increases after the vehicle power supply system 1 is turned off most recently and a probability that the backup low-voltage power supply 23 is in a state in which the backup low-voltage power supply 23 cannot supply electric power for operating the emergency important load 22 is high, and the backup low-voltage power supply state estimation processing can be prevented from being executed when the probability that the backup low-voltage power supply 23 in a state in which the backup low-voltage power supply 23 cannot supply electric power for operating the emergency important load 22 is low. Therefore, it is possible to reduce power consumption when the vehicle power supply system 1 is in an OFF state.

On the other hand, when the information stored in the storage medium 25a is not information indicating that "the backup low-voltage power supply 23 is in a state in which the backup low-voltage power supply 23 can supply electric power for operating the emergency important load 22" (step S510: NO), that is, when the information stored in the storage medium 25a is information indicating that "the backup low-voltage power supply 23 is in a state in which the backup low-voltage power supply 23 cannot supply electric power for operating the emergency important load 22", or when the information indicating whether the backup low-voltage power supply 23 is in a state in which the backup low-voltage power supply 23 can supply electric power for operating the emergency important load 22 is not stored in the storage medium 25a, the processing proceeds to step S600.

In step S600, a backup low-voltage power supply state estimation processing is executed. The backup low-voltage power supply state estimation processing in step S600 is the same as the backup low-voltage power supply state estimation processing in step S300 described above. The required remaining amount Rset calculated in the backup low-voltage power supply state estimation processing when the vehicle power supply system 1 is turned on, that is, the required remaining amount Rset calculated in the backup low-voltage power supply state estimation processing in step S600 is an electric power capacity required for the backup low-voltage power supply 23 to operate the emergency important load 22 at the time of calculating the required remaining amount Rset.

When the backup low-voltage power supply state estimation processing in step S600 is completed, the processing proceeds to step S520.

In step S520, it is determined whether an estimation result of the backup low-voltage power supply state estimation processing in step S600 is an estimation result indicating that the backup low-voltage power supply 23 is in a state in which the backup low-voltage power supply 23 can supply electric power for operating the emergency important load 22. When the estimation result of the backup low-voltage power supply state estimation processing in step S600 is an estimation result indicating that "the backup low-voltage power supply 23 is in a state in which the backup low-voltage power supply 23 can supply electric power for operating the emergency important load 22" (step S520: YES), the processing proceeds to step S581, and the backup power supply control device 25 outputs a signal indicating that "the backup low-voltage power supply 23 is in a state in which the backup low-voltage power supply 23 can supply electric power for operating the emergency important load 22" to the ECU 50, and ends the series of processings. When the estimation result of the backup low-voltage power supply state estimation processing in step S600 is an estimation result indicating that "the backup low-voltage power supply 23 is not in a state in which the backup low-voltage power supply 23 can supply electric power for operating the emergency important load 22" (step S520: NO), the processing proceeds to step S530.

In step S530, it is determined whether the estimation result of the backup low-voltage power supply state estimation processing in step S600 is an estimation result indicating that "the backup low-voltage power supply 23 is in a state in which the backup low-voltage power supply 23 cannot supply electric power for operating the emergency important load 22 since a storage power remaining amount of the backup low-voltage power supply 23 is insufficient". When the estimation result of the backup low-voltage power supply state estimation processing in step S600 is an estimation result indicating that "the backup low-voltage power supply 23 is in a state in which the backup low-voltage power supply 23 cannot supply electric power for operating the emergency important load 22 since the storage power remaining amount of the backup low-voltage power supply 23 is insufficient" (step S530: YES), the processing proceeds to step S540. When the estimation result of the backup low-voltage power supply state estimation processing in step S600 is not an estimation result indicating that "the backup low-voltage power supply 23 is in a state of in which the backup low-voltage power supply 23 cannot supply electric power for operating the emergency important load 22 since the storage power remaining amount of the backup low-voltage power supply 23 is insufficient" (step S530: NO), that is, when the estimation result of the backup low-voltage power supply state estimation processing in step S600 is an estimation result indicating that "the backup low-voltage power supply 23 is in a state in which the backup low-voltage power supply 23 cannot supply electric power for operating the emergency important load 22 since the performance of the backup low-voltage power supply 23 is low", the processing proceeds to step S582.

In step S540, the backup power supply control device 25 outputs, to the ECU 50, a signal indicating that "the backup low-voltage power supply 23 is in a state in which the backup low-voltage power supply 23 cannot supply electric power for operating the emergency important load 22". Then, the processing proceeds to step S550.

In step S550, charging of the backup low-voltage power supply 23 is started. The electric power used to charge the backup low-voltage power supply 23 is supplied from at least one of the high-voltage power supply 31 and the main low-voltage power supply 11. Then, the processing proceeds to step S560.

In step S560, it is determined whether the storage power remaining amount R of the backup low-voltage power supply 23 is equal to or larger than the required remaining amount Rset. When the storage power remaining amount R of the backup low-voltage power supply 23 is not equal to or larger than the required remaining amount Rset, the charging of the backup low-voltage power supply 23 is continued until the storage power remaining amount R of the backup low-voltage power supply 23 becomes equal to or larger than the required remaining amount Rset (a loop of step S560: NO).

When the storage power remaining amount R of the backup low-voltage power supply 23 is equal to or larger than the required remaining amount Rset (step S560: YES), the processing proceeds to step S570, and the charging of the backup low-voltage power supply 23 is ended. Then, the processing returns to step S600, and the backup low-voltage power supply state estimation processing is executed again. At this time, since the storage power remaining amount R of the backup low-voltage power supply 23 is equal to or larger than the required remaining amount Rset by executing the processings from steps S550 to S570, the estimation result of the backup low-voltage power supply state estimation processing in step S600 is either "the backup low-voltage power supply 23 is in a state in which the backup low-voltage power supply 23 can supply electric power for operating the emergency important load 22" (step S321) or "the backup low-voltage power supply 23 is in a state in which the backup low-voltage power supply 23 cannot supply electric power for operating the emergency important load 22 since the performance of the backup low-voltage power supply 23 is low" (step S322).

In step S582, the backup power supply control device 25 outputs, to the ECU 50, a signal indicating that "the backup low-voltage power supply 23 is in a state in which the backup low-voltage power supply 23 cannot supply electric power for operating the emergency important load 22". Then, the processing proceeds to step S583.

In step S583, the backup power supply control device 25 outputs a signal indicating that the performance of the backup low-voltage power supply 23 is low to the ECU 50. Then, the series of processings is ended.

As described above, the vehicle V is a vehicle capable of autonomous driving under a specific condition in the present embodiment. When a signal indicating that the backup low-voltage power supply 23 is in a state in which the backup low-voltage power supply 23 can supply electric power for operating the emergency important load 22 is input to the ECU 50 from the backup power supply control device 25, the ECU 50 permits autonomous driving of the vehicle V. As a result, the vehicle V can perform autonomous driving.

On the other hand, when a signal indicating that the backup low-voltage power supply 23 is in a state in which the backup low-voltage power supply 23 cannot supply electric power for operating the emergency important load 22 is input to the ECU 50 from the backup power supply control device 25, the ECU 50 does not permit autonomous driving of the vehicle V. As a result, the autonomous driving of the vehicle V is suspended.

When a signal indicating that the performance of the backup low-voltage power supply 23 is low is input to the ECU 50 from the backup power supply control device 25, the ECU 50 operates, for example, a notification device (not shown) provided in a vehicle cabin of the vehicle V to notify a user of the vehicle V that the performance of the backup low-voltage power supply 23 is low. The notification device may be a display device capable of displaying information indicating that the performance of the backup low-voltage power supply 23 is low, or may be a display lamp that can be turned on when the performance of the backup low-voltage power supply 23 is low.

(Modification of Backup Low-Voltage Power Supply State Estimation Processing)

The backup low-voltage power supply state estimation processings in step S300 and step S600 may be performed by a flow different from the flows described above with reference to FIGS. 6 and 7. Here, a modification of the backup low-voltage power supply state estimation processing will be described with reference to FIG. 8.

Figure 8:
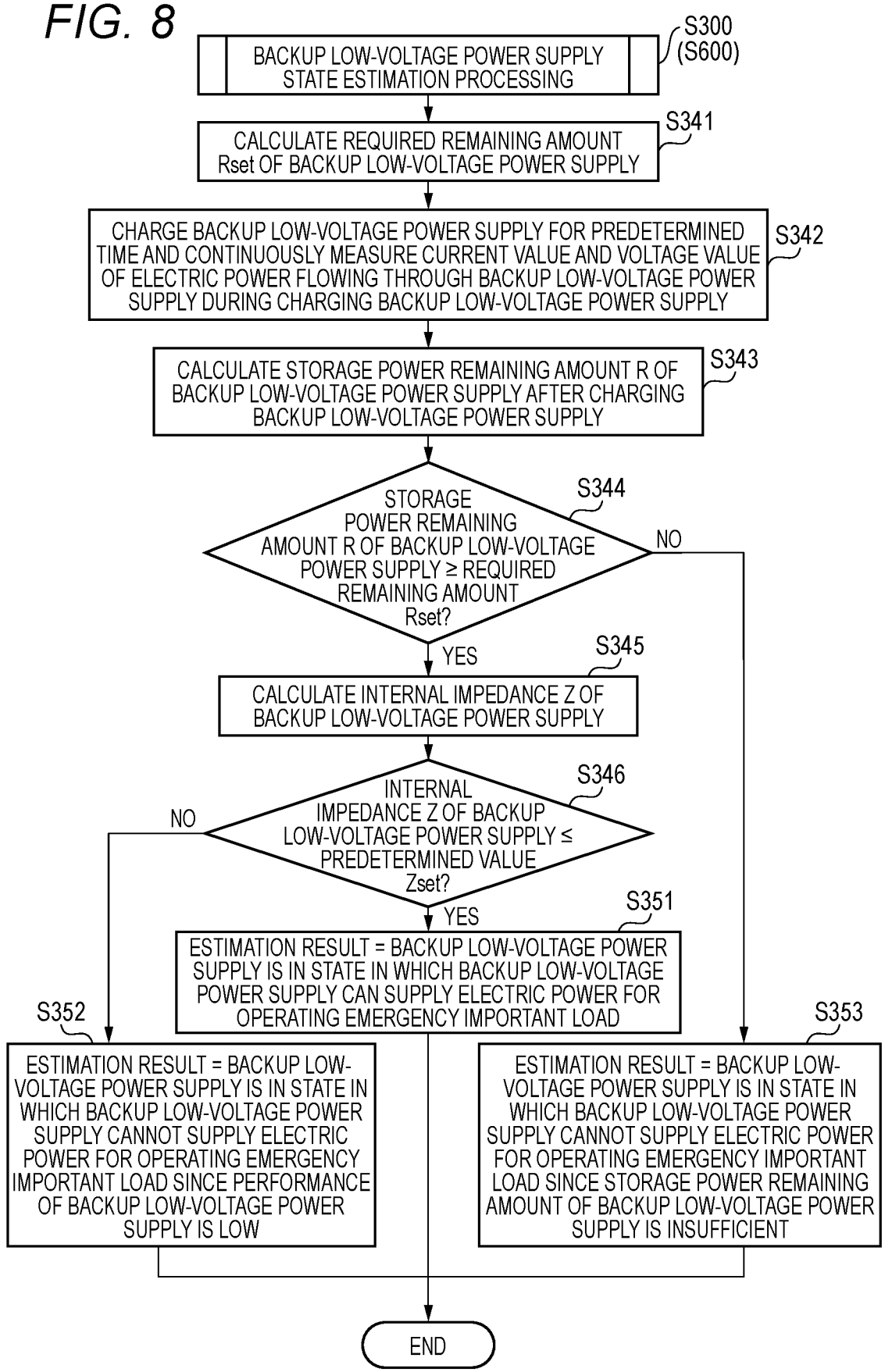
FIG. 8 is a flowchart showing a modification of the backup low-voltage power supply state estimation processing in the vehicle power supply system according to the embodiment of the present invention.

As shown in FIG. 8, in the backup low-voltage power supply state estimation processing, first, the processing proceeds to step S341, and the required remaining amount Rset of the backup low-voltage power supply 23 is calculated. Step S341 is the same processing as step S301 described above. The required remaining amount Rset calculated when the vehicle power supply system 1 is turned off, that is, the required remaining amount Rset calculated in the backup low-voltage power supply state estimation processing in step S300 is an electric power capacity required for the backup low-voltage power supply 23 to operate the emergency important load 22 after the (predetermined time tset)–(elapsed time t) elapses from the time point when the required remaining amount Rset is calculated based on the temperature T of the backup low-voltage power supply 23 acquired in step S220 and the discharge amount Q of the backup low-voltage power supply 23 that is started to be measured in step S130 and is calculated after the vehicle power supply system 1 is turned off. On the other hand, the required remaining amount Rset calculated in the backup low-voltage power supply state estimation processing when the vehicle power supply system 1 is turned on, that is, the required remaining amount Rset calculated in the backup low-voltage power supply state estimation processing in step S600 is an electric power capacity required for the backup low-voltage power supply 23 to operate the emergency important load 22 at the time of calculating the required remaining amount Rset. Then, the processing proceeds to step S342.

In step S342, the backup low-voltage power supply 23 is charged for a predetermined time that is set in advance in order to manage and estimate a state of the backup low-voltage power supply 23. The electric power used to charge the backup low-voltage power supply 23 is supplied from at least one of the high-voltage power supply 31 and the main low-voltage power supply 11. Further, in step S342, a current value and a voltage value of electric power flowing through the backup low-voltage power supply 23 are continuously measured for the predetermined time during which the backup low-voltage power supply 23 is charged. In step S342, the internal resistance value of the backup low-voltage power supply 23 may be continuously measured for the predetermined time during which the backup low-voltage power supply 23 is charged. In step S342, when the charging of the backup low-voltage power supply 23 is completed after the predetermined time elapses, the processing proceeds to step S343.

In step S343, the storage power remaining amount R of the backup low-voltage power supply 23 after the backup low-voltage power supply 23 is charged in step S342 is calculated. The storage power remaining amount R of the backup low-voltage power supply 23 is calculated, for example, based on the current value and the voltage value of the electric power flowing through the backup low-voltage power supply 23 that are continuously measured at the time of charging the backup low-voltage power supply 23 in step S342. Then, the processing proceeds to step S344.

In step S344, it is determined whether the storage power remaining amount R of the backup low-voltage power supply 23 calculated in step S343 is equal to or larger than the required remaining amount Rset. When the storage power remaining amount R of the backup low-voltage power supply 23 calculated in step S343 is equal to or larger than the required remaining amount Rset (step S344: YES), the processing proceeds to step S345. When the storage power remaining amount R of the backup low-voltage power supply 23 calculated in step S343 is not equal to or larger than the required remaining amount Rset (step S344: NO), the processing proceeds to step S353, and the backup low-voltage power supply state estimation processing is ended with an estimation result of the backup low-voltage power supply state estimation processing being "the backup low-voltage power supply 23 is in a state in which the backup low-voltage power supply 23 cannot supply electric power for operating the emergency important load 22 since the storage power remaining amount of the backup low-voltage power supply 23 is insufficient".

In step S345, the internal impedance Z of the backup low-voltage power supply 23 is calculated. The internal impedance Z of the backup low-voltage power supply 23 is calculated, for example, based on behaviors of the current value and the voltage value of the electric power flowing through the backup low-voltage power supply 23 that are continuously measured at the time of charging the backup low-voltage power supply 23 in step S342. The internal impedance Z of the backup low-voltage power supply 23 may be calculated, for example, based on a behavior of the internal resistance value of the backup low-voltage power supply 23 measured in the predetermined time during which the backup low-voltage power supply 23 is charged in step S342. Then, the processing proceeds to step S346.

In step S346, it is determined whether the internal impedance Z of the backup low-voltage power supply 23 calculated in step S345 is equal to or less than a predetermined value Zset. When the internal impedance Z of the backup low-voltage power supply 23 calculated in step S345 is equal to or less than the predetermined value Zset (step S346: YES), the processing proceeds to step S351, and backup low-voltage power supply state estimation processing is ended with an estimation result of backup low-voltage power supply state estimation processing being "the backup low-voltage power supply 23 is in a state in which the backup low-voltage power supply 23 can supply electric power for operating the emergency important load 22".

On the other hand, when it is determined in step S346 that the internal impedance Z of the backup low-voltage power supply 23 calculated in step S345 is not equal to or less than the predetermined value Zset (step S346: NO), the processing proceeds to step S352, and the backup low-voltage power supply state estimation processing is ended with an estimation result of the backup low-voltage power supply state estimation processing being "the backup low-voltage power supply 23 is in a state in which the backup low-voltage power supply 23 cannot supply electric power for operating the emergency important load 22 since the performance of backup low-voltage power supply 23 is low".

As a result, a series of processings of the backup low-voltage power supply state estimation processing is ended.

<Operation of Vehicle Power Supply System when Vehicle Power Supply System is in ON State>

Next, an operation of the vehicle power supply system 1 when the vehicle power supply system 1 is turned on will be described.

(Operation of Vehicle Power Supply System in Normal State when Vehicle Power Supply System is in ON State)

First, an operation of the vehicle power supply system 1 in a normal state when the vehicle power supply system 1 is turned on will be described.

When the vehicle power supply system 1 is turned on and the vehicle power supply system 1 is in a normal state, the backup power supply control device 25 controls the first switch SW1 to be in an ON state, the second switch SW2 to be in an OFF state, and the third switch SW3 to be in an OFF state. That is, when the vehicle power supply system 1 is turned on and the vehicle power supply system 1 is in a normal state, the switching device 24 maintains the first switch SW1 in an ON state, the second switch SW2 in an OFF state, and the third switch SW3 in an OFF state. Accordingly, when the vehicle power supply system 1 is turned on and the vehicle power supply system 1 is in a normal state, the normal load 12 and the emergency important load 22 are operated using electric power supplied from the main low-voltage power supply 11.

(Operation of Vehicle Power Supply System in Case of Abnormality Occurs in Main Power Supply System when Vehicle Power Supply System is in ON State)

Next, an operation of the vehicle power supply system 1 in a case where an abnormality occurs in the main power supply system 10 when the vehicle power supply system 1 is turned on will be described with reference to FIG. 9.

A voltage sensor (not shown) that detects an output voltage of the main low-voltage power supply 11 is connected to the main low-voltage power supply 11. The voltage sensor outputs a signal indicating the output voltage of the main low-voltage power supply 11. The signal that indicates the output voltage of the main low-voltage power supply 11 and is output from the voltage sensor may be input to the ECU 50 or may be input to the backup power supply control device 25. When the signal indicating the output voltage of the main low-voltage power supply 11 is input to the backup power supply control device 25, the signal indicating the output voltage of the main low-voltage power supply 11 may be input to the backup power supply control device 25 via the ECU 50 or may be directly input to the backup power supply control device 25 from the voltage sensor.

The vehicle power supply system 1 can execute an abnormality determination processing of determining whether an abnormality occurs in the main power supply system 10. The abnormality determination processing may be executed by the ECU 50 or may be executed by the backup power supply control device 25. Here, a control flow in a case where the abnormality determination processing is executed by the backup power supply control device 25 will be described as an example.

Figure 9:
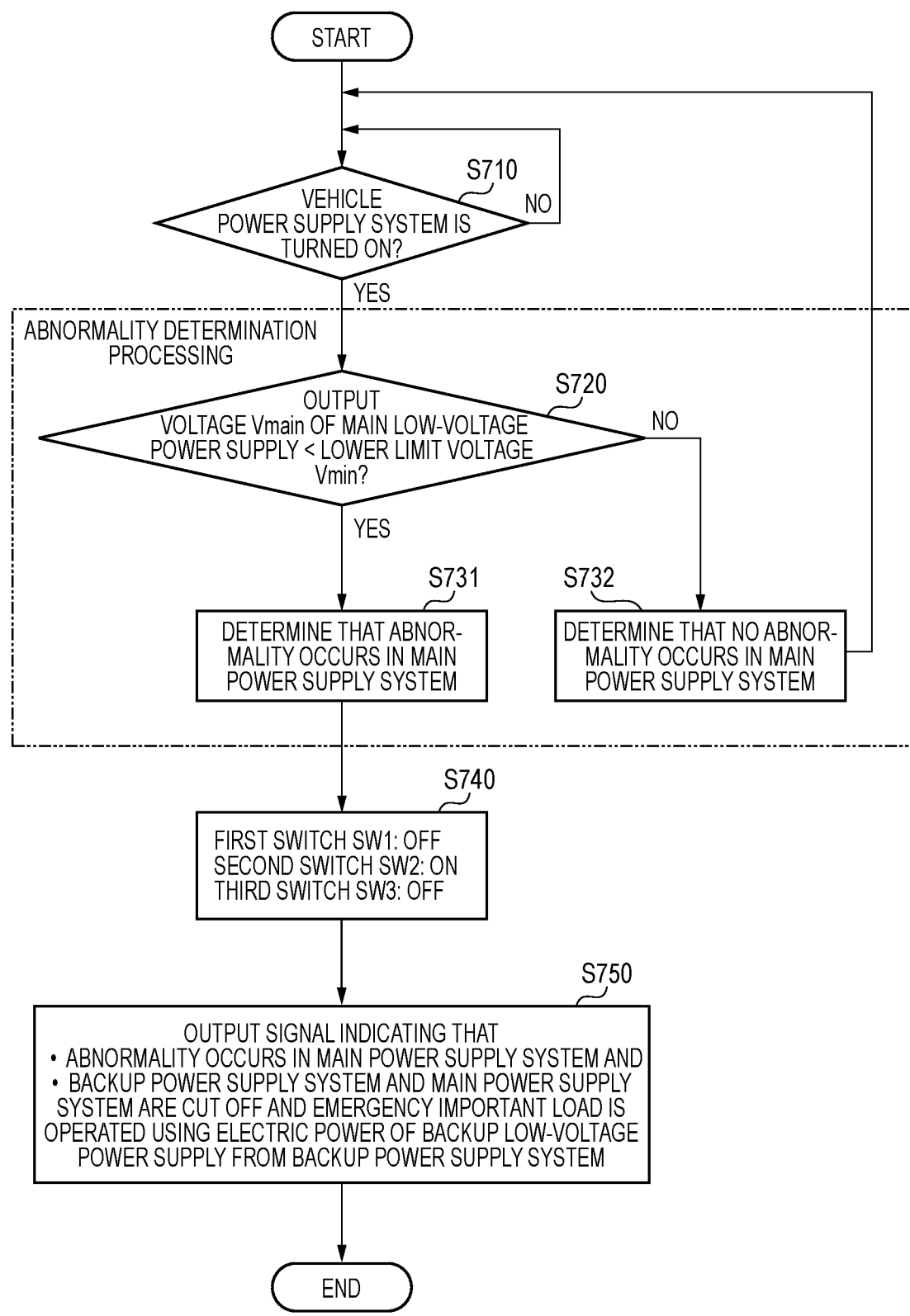
FIG. 9 is a flowchart showing an example of an operation of the vehicle power supply system in a case where an abnormality occurs in a main power supply system when the vehicle power supply system is turned on according to the embodiment of the present invention.

As shown in FIG. 9, first, it is determined in step S710 whether the vehicle power supply system 1 is turned on. When the vehicle power supply system 1 is turned on (step S710: YES), the processing proceeds to step S720, and the abnormality determination processing is executed. On the other hand, when the vehicle power supply system 1 is not turned on, that is, when the vehicle power supply system 1 is turned off, the processing does not proceed to the abnormality determination processing, and the vehicle power supply system 1 enters a standby state until the vehicle power supply system 1 is turned on (a loop of step S710: NO). Accordingly, when the vehicle power supply system 1 is turned off, power consumption of the vehicle power supply system 1 can be reduced without executing the abnormality determination processing.

In step S720, it is determined whether an output voltage Vmain of the main low-voltage power supply 11 is lower than a preset lower limit voltage Vmin based on the signal that indicates the output voltage of the main low-voltage power supply 11 and is input to the backup power supply control device 25. When the output voltage Vmain of the main low-voltage power supply 11 is not lower than the preset lower limit voltage Vmin (step S720: NO), the processing proceeds to step S732, it is determined that no abnormality occurs in the main power supply system 10, and the processing returns to step S710.

When the output voltage Vmain of the main low-voltage power supply 11 is lower than the preset lower limit voltage Vmin (step S720: YES), the processing proceeds to step S731, it is determined that an abnormality occurs in the main power supply system 10, and the processing proceeds to step S740.

In step S740, the backup power supply control device 25 performs a control such that the first switch SW1 is switched to an OFF state, the second switch SW2 is switched to an ON state, and the third switch SW3 is maintained in an OFF state.

Therefore, in a case where the vehicle power supply system 1 is turned on, when the abnormality determination processing is executed and it is determined that an abnormality occurs in the main power supply system 10, since both the first switch SW1 and the third switch are turned off, the main power supply system 10 and the backup power supply system 20 are cut off. Since the second switch SW2 is turned on, electric power of the backup low-voltage power supply 23 is supplied from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. The electric power of the backup low-voltage power supply 23 is supplied from the connection line L21 to the emergency important load 22 through the connection line L241 and the connection line L212.

When step S740 is completed, the processing proceeds to step S750, and the backup power supply control device 25 outputs, to the ECU 50, a signal indicating that an abnormality occurs in the main power supply system 10, the backup power supply system 20 and the main power supply system 10 are cut off, and the emergency important load 22 is operated using the electric power of the backup low-voltage power supply 23 from the backup power supply system 20, and the series of processings is ended.

When the signal indicating that an abnormality occurs in the main power supply system 10, the backup power supply system 20 and the main power supply system 10 are cut off, and the emergency important load 22 is operated using the electric power of the backup low-voltage power supply 23 from the backup power supply system 20 is input to the ECU 50 from the backup power supply system 20, the ECU 50 performs a minimal risk maneuver (MRM) that is a minimum necessary traveling operation, stopping operation, or drive control for safely moving the vehicle V to a road shoulder of a road and stopping the vehicle V.

Accordingly, even when an abnormality occurs in the main power supply system 10 in a case where the vehicle power supply system 1 is turned on, the emergency important load 22 can be operated using the electric power of the backup low-voltage power supply 23, so that it is possible to perform a minimal risk maneuver (MRM) that is a minimum necessary traveling operation, stopping operation, or drive control for safely moving the vehicle V to a road shoulder of a road and stopping the vehicle V. Further, when the vehicle power supply system 1 transitions from an OFF state to an ON state, a signal indicating whether the backup low-voltage power supply 23 is in a state in which backup low-voltage power supply 23 can supply electric power for operating the emergency important load 22 is output from the backup power supply control device 25, so that the ECU 50 performs a drive control of the vehicle V based on the signal indicating whether the backup low-voltage power supply 23 is in a state in which backup low-voltage power supply 23 can supply electric power for operating the emergency important load 22. Accordingly, when an abnormality occurs in the main power supply system 10 in a case where the vehicle power supply system 1 is turned on, it is possible to reliably supply electric power for operating the emergency important load 22 from the backup low-voltage power supply 23. For example, the ECU 50 permits autonomous driving of the vehicle V on a condition that a signal indicating that the backup low-voltage power supply 23 is in a state in which the backup low-voltage power supply 23 can supply electric power for operating the emergency important load 22 is output from the backup power supply control device 25, so that even when an abnormality occurs in the main power supply system 10 during autonomous driving of the vehicle V, electric power for operating the emergency important load 22 can be reliably supplied from the backup low-voltage power supply 23, and it is possible to reliably perform a minimal risk maneuver (MRM) that is a minimum necessary traveling operation, stopping operation, or drive control for safely moving the vehicle V to a road shoulder of a road and stopping the vehicle V.

In addition, when an abnormality occurs in the main power supply system 10 in a case where the vehicle power supply system 1 is turned on, since the backup power supply system 20 and the main power supply system 10 are cut off, electric power of the backup low-voltage power supply 23 is not supplied to the normal load 12. As a result, it is possible to operate the emergency important load 22 while reducing power consumption of the backup low-voltage power supply 23.

In addition, the first switch SW1 and the third switch SW3 are semiconductor switches, whereas the second switch SW2 is a DC-DC converter, so that a time required for switching the second switch SW2 between an ON state and an OFF state may be longer than that of the first switch SW1 and the third switch SW3. However, since the switching device 24 includes the capacitor CP as described above, electric power stored in the capacitor CP is discharged in a time from the completion of switching the first switch SW1 to an OFF state to the completion of switching the second switch SW2 to an ON state. Therefore, it is possible to supply electric power to the emergency important load 22 in the time from the completion of switching the first switch SW1 to an OFF state to the completion of switching the second switch SW2 to an ON state.

In this manner, when the vehicle power supply system 1 is turned on, the vehicle power supply system 1 executes the abnormality determination processing of determining whether an abnormality occurs in the main power supply system 10. Accordingly, the vehicle power supply system 1 can constantly monitor whether an abnormality occurs in the main power supply system 10 when the vehicle power supply system 1 is turned on, so that the switching device 24 can be quickly operated when an abnormality occurs in the main power supply system 10. On the other hand, when the vehicle power supply system 1 transitions from an OFF state to an ON state, the backup power supply control device 25 outputs a signal indicating whether the backup low-voltage power supply 23 is in a state in which the backup low-voltage power supply 23 can supply electric power for operating the emergency important load 22. Accordingly, the vehicle power supply system 1 can be operated without constantly monitoring whether the backup low-voltage power supply 23 is in a state in which the backup low-voltage power supply 23 can supply electric power for operating the emergency important load 22, so that power consumption can be reduced.

Although an embodiment of the present invention has been described above with reference to the accompanying drawings, it is needless to say that the present invention is not limited to such an embodiment. It will be apparent to those skilled in the art that various changes and modifications may be conceived within the scope of the claims. It is also understood that the various changes and modifications belong to the technical scope of the present invention. In addition, the constituent elements in the above-described embodiment may be freely combined without departing from a spirit of the invention.

For example, the abnormality determination processing of determining whether an abnormality occurs in the main power supply system 10 according to the present embodiment is an example, and the abnormality determination processing may determine whether an abnormality occurs in the main power supply system 10 using any device and method. For example, the main power supply system 10 may be provided with a voltage sensor, a current sensor, or the like (not shown), a voltage or a current of the main power supply system 10 may be estimated based on a signal indicating a voltage value or a current value output from the voltage sensor or the current sensor, whether the voltage or the current of the main power supply system 10 is a value within a preset predetermined range may be determined, and a determination may be made that an abnormality occurs in the main power supply system 10 when the voltage or the current of the main power supply system 10 is not a value within the preset predetermined range.

For example, although the switching device 24 includes the connection line L243 connected in parallel with the connection line L241, the first switch SW1 is provided on the connection line L241, and the third switch SW3 is provided on the connection line L243 in the present embodiment, the switching device 24 may not include the connection line L243, and a changeover switch in which functions of the first switch SW1 and the third switch SW3 according to the present embodiment are integrated may be provided on the connection line L241 instead of the first switch SW1 and the third switch SW3. Specifically, for example, the changeover switch may be a switch having a normally closed (N.C.) contact, and when an operation signal is not applied to the changeover switch, the changeover switch may be maintained in an ON state and the connection line L241 may be maintained in a connected state. Further, the changeover switch may be an electromagnetic switch (for example, an electromagnetic contactor or an electromagnetic switch) in which an operation force is an electromagnetic force, and when an electromagnetic force caused by an operation current is not generated, the changeover switch may be maintained in an ON state and the connection line L241 may be maintained in a connected state. The changeover switch may be, for example, a single semiconductor switch. In the abnormality determination processing, when it is determined that an abnormality occurs in the main power supply system 10, the changeover switch is switched to an OFF state by the backup power supply control device 25.

For example, although in step S130 (see FIG. 2), the measurement of the discharge amount Q of the backup low-voltage power supply 23 is started after the vehicle power supply system 1 is turned off, and in step S240 (see FIG. 3), it is determined whether the discharge amount Q of the backup low-voltage power supply 23 after the vehicle power supply system 1 is turned off is equal to or less than the predetermined value Qset in the present embodiment, step S130 and step S240 may be omitted. Accordingly, when the vehicle power supply system 1 is turned off, it is not necessary to consume electric power required for measuring the discharge amount Q of the backup low-voltage power supply 23, so that it is possible to reduce power consumption when the vehicle power supply system 1 is in an OFF state.

For example, although in step S120 (see FIG. 2), the temperature T0 of the backup low-voltage power supply 23 when the vehicle power supply system 1 is turned off is acquired, in step S220 (see FIG. 3), the temperature T of the backup low-voltage power supply 23 is acquired, and the temperature difference $\Delta T=|T-T0|$ is calculated based on the acquired temperature T of the backup low-voltage power supply 23 and the temperature T0 of the backup low-voltage power supply 23 that is acquired in step S120 when the vehicle power supply system 1 is turned off, and in step S230 (see FIG. 3), it is determined whether the temperature difference $\Delta T (=|T-T0|)$ acquired in step S220 is equal to or less than the predetermined value Tset in the present embodiment, step S120, step S220, and step S230 may be omitted. Accordingly, when the vehicle power supply system 1 is turned off, a temperature sensor for measuring the temperature T0 and the temperature T of the backup low-voltage power supply 23 is not necessary.

For example, although the second switch SW2 is a DC-DC converter in the present embodiment, the second switch SW2 may be capable of switching the connection line L242 between a connected state and a cut-off state. Therefore, the second switch SW2 may be any switch capable of switching the connection line L242 between a connected state and a cut-off state, and may be, for example, a semiconductor switch having a normally open (N.O.) contact or a normally closed (N.C.) contact.

For example, although the capacitor CP is provided on the connection line L244 in the switching device 24 in the present embodiment, the capacitor CP may not be provided on the connection line L244 in the switching device 24, for example, in a case where the second switch SW2 can be switched between an ON state and an OFF state in a short time.

At least the following matters are described in the present description. In the parentheses, corresponding components and the like in the above embodiment are shown as an example, and the present invention is not limited thereto.

(1) A vehicle power supply system (the vehicle power supply system 1) mounted on a vehicle (the vehicle V) including:
   a main power supply system (the main power supply system 10) that is provided with a main low-voltage power supply (the main low-voltage power supply 11) and a normal load (the normal load 12); and
   a backup power supply system (the backup power supply system 20) that is provided with a backup low-voltage power supply (the backup low-voltage power supply 23) and an emergency important load (the emergency important load 22) and is connected to the main power supply system, in which
   the backup power supply system is configured to supply electric power of the backup low-voltage power supply to the main power supply system,
   the backup power supply system includes
      a switching device (the switching device 24) configured to switch a state of connection of the backup power supply system with the main power supply system between a connected state and a cut-off state, and
      a backup power supply controller (the backup power supply control device 25) that controls the switching device, and
   the backup power supply controller is configured to
   execute a backup low-voltage power supply state estimation processing of estimating whether the backup low-voltage power supply is in a state in which the backup low-voltage power supply is able to supply electric power for operating the emergency important load,
   output a signal indicating whether the backup low-voltage power supply is in a state in which the backup low-voltage power supply is able to supply electric power for operating the emergency important load, based on an estimation result of the backup low-voltage power supply state estimation processing, and
   execute the backup low-voltage power supply state estimation processing when the vehicle power supply system is turned off and a state of the vehicle satisfies a predetermined condition.

According to (1), when the vehicle power supply system is turned off and a state of the vehicle satisfies a predetermined condition, a backup low-voltage power supply state estimation processing is executed, and it is estimated whether the backup low-voltage power supply is in a state in which the backup low-voltage power supply can supply electric power for operating the emergency important load, so that it is possible to output, in a short time, a signal indicating that the backup low-voltage power supply is in a state in which the backup low-voltage power supply can supply electric power for operating the emergency important load when the vehicle power supply system transitions from an OFF state to an ON state in a case where the backup low-voltage power supply is in a state in which the backup low-voltage power supply can supply electric power for operating the emergency important load.

(2) The vehicle power supply system according to claim (1), in which
   the predetermined condition includes a condition that an elapsed time (the elapsed time t) from when the vehicle power supply system is turned off most recently is equal to or longer than a predetermined time (the predetermined time tset).

According to (2), since the backup low-voltage power supply state estimation processing is executed when the predetermined condition that the elapsed time from when the vehicle power supply system is turned off most recently is equal to or longer than the predetermined time is satisfied, it is possible to execute the backup low-voltage power supply state estimation processing when a probability that the storage power remaining amount of the backup low-voltage power supply is reduced due to standby electric power of the normal load and the emergency important load or the like and the backup low-voltage power supply is in a state in which the backup low-voltage power supply cannot supply electric power for operating the emergency important load is high, while reducing power consumption when the vehicle power supply system is in an OFF state.

(3) The vehicle power supply system according to claim (2), in which
   the predetermined condition includes a condition that a temperature difference (the temperature difference ΔT) between a present temperature (the temperature T) of the backup low-voltage power supply and a temperature (the temperature TO) of the backup low-voltage power supply when the vehicle power supply system is turned off most recently is equal to or larger than a predetermined value (the predetermined value Tset).

According to (3), since the backup low-voltage power supply state estimation processing is executed when the predetermined condition that the temperature difference between the temperature of the backup low-voltage power supply and the temperature of the backup low-voltage power supply when the vehicle power supply system is turned off most recently is equal to or larger than the predetermined value is satisfied, the backup low-voltage power supply state estimation processing can be executed when the temperature of the backup low-voltage power supply rapidly decreases or increases after the vehicle power supply system is turned off most recently and a probability that the backup low-voltage power supply is in a state in which the backup low-voltage power supply cannot supply electric power for operating the emergency important load is high, and the backup low-voltage power supply state estimation processing can be prevented from being executed when the probability that the backup low-voltage power supply in a state in which the backup low-voltage power supply cannot supply electric power for operating the emergency important load is low. Therefore, it is possible to reduce power consumption when the vehicle power supply system is in an OFF state.

(4) The vehicle power supply system according to (2) or (3), in which,
   the predetermined condition includes a condition that a discharge amount (the discharge amount Q) of the backup low-voltage power supply after the vehicle power supply system is turned off most recently is equal to or larger than a predetermined value (the predetermined value Qset).

According to (4), since the backup low-voltage power supply state estimation processing is executed when the predetermined condition that the discharge amount of the backup low-voltage power supply after the vehicle power supply system is turned off most recently is equal to or larger than the predetermined value is satisfied, the backup low-voltage power supply state estimation processing can be executed when the discharge amount of the backup low-voltage power supply increases after the vehicle power supply system is turned off most recently and a probability that the backup low-voltage power supply is in a state in which the backup low-voltage power supply cannot supply electric power for operating the emergency important load is high, and the backup low-voltage power supply state estimation processing can be prevented from being executed when the probability that the backup low-voltage power supply in a state in which the backup low-voltage power supply cannot supply electric power for operating the emergency important load is low. Therefore, it is possible to reduce power consumption when the vehicle power supply system is in an OFF state.

(5) The vehicle power supply system according to any one of (1) to (4), in which,
the backup power supply controller controls the switching device to cut off a connection between the backup power supply system and the main power supply system and to supply electric power of the backup low-voltage power supply to the emergency important load when an abnormality occurs in the main power supply system.

According to (5), since the backup power supply control device controls the switching device so as to supply electric power of the backup low-voltage power supply to the emergency important load when an abnormality occurs in the main power supply system, even when an abnormality occurs in the main power supply system in a case where the vehicle power supply system is turned on, the emergency important load can be operated using the electric power of the backup low-voltage power supply, and thus it is possible to perform a minimal risk maneuver (MRM) that is a minimum necessary traveling operation, stopping operation, or drive control for safely moving the vehicle V to a road shoulder of a road and stopping the vehicle V. Further, since a signal indicating whether the backup low-voltage power supply is in a state in which the backup low-voltage power supply can supply electric power for operating the emergency important load is output from the backup power supply control device when the vehicle power supply system transitions from the OFF state to the ON state, the drive control of the vehicle is performed based on the signal indicating whether the backup low-voltage power supply is in a state in which the backup low-voltage power supply can supply electric power for operating the emergency important load. Therefore, in a case where an abnormality occurs in the main power supply system when the vehicle power supply system is turned on, it is possible to reliably supply electric power for operating the emergency important load from the backup low-voltage power supply.

In addition, in a case where an abnormality occurs in the main power supply system when the vehicle power supply system is turned on, since the backup power supply system is cut off from the main power supply system, electric power of the backup low-voltage power supply is not supplied to the normal load. Accordingly, it is possible to operate the emergency important load while reducing power consumption of the backup low-voltage power supply.

(6) The vehicle power supply system according to any one of (1) to (5), in which
when the vehicle power supply system is turned on, the vehicle power supply system executes an abnormality determination processing of determining whether an abnormality occurs in the main power supply system.

According to (6), the vehicle power supply system can constantly monitor whether an abnormality occurs in the main power supply system when the vehicle power supply system is turned on, so that the switching device can be quickly operated when an abnormality occurs in the main power supply system.

(7) The vehicle power supply system according to any one of (1) to (6), further including:
a high-voltage power supply system (the high-voltage power supply system 30) that is provided with a high-voltage power supply (the high-voltage power supply 31) configured to output electric power having a higher voltage than that of the main low-voltage power supply and the backup low-voltage power supply, and a high-voltage load (the high-voltage load 32) operated with electric power having a higher voltage than that of the normal load and the emergency important load, and
a step-down device (the step-down device 40) configured to step down electric power flowing through the high-voltage power supply system, in which
the high-voltage power supply system is connected to the backup power supply system via the step-down device, and
the backup low-voltage power supply is chargeable with electric power of the high-voltage power supply via the step-down device.

According to (7), since electric power of the high-voltage power supply can be used to charge the backup low-voltage power supply via the step-down device, it is possible to prevent the storage power remaining amount of the backup low-voltage power supply of the backup power supply system from being depleted.

What is claimed is:
1. A vehicle power supply system mounted on a vehicle, the vehicle power supply system comprising:
a main power supply system that is provided with a main low-voltage power supply and a normal load; and
a backup power supply system that is provided with a backup low-voltage power supply and an emergency important load and is connected to the main power supply system,
wherein the backup power supply system is configured to supply electric power of the backup low-voltage power supply to the main power supply system,
wherein the backup power supply system includes
a switching device configured to switch a state of connection of the backup power supply system with the main power supply system between a connected state and a cut-off state, and
a backup power supply controller that controls the switching device,
wherein the backup power supply controller is configured to
execute a backup low-voltage power supply state estimation processing of estimating whether the backup low-voltage power supply is in a state in which the backup low-voltage power supply is able to supply electric power for operating the emergency important load,
output a signal indicating whether the backup low-voltage power supply is in a state in which the backup low-voltage power supply is able to supply electric power for operating the emergency important load, based on an estimation result of the backup low-voltage power supply state estimation processing, and
execute the backup low-voltage power supply state estimation processing when the vehicle power sup- ply system is turned off and a state of the vehicle satisfies a predetermined condition, and wherein the switching device connects the backup power supply system and the main power supply system while the backup power supply controller is not supplied with power.

2. The vehicle power supply system according to claim 1, wherein the predetermined condition includes a condition that an elapsed time from when the vehicle power supply system is turned off most recently is equal to or longer than a predetermined time.

3. The vehicle power supply system according to claim 2, wherein the predetermined condition further includes a condition that a temperature difference between a present temperature of the backup low-voltage power supply and a temperature of the backup low-voltage power supply when the vehicle power supply system is turned off most recently is equal to or larger than a predetermined value.

4. The vehicle power supply system according to claim 2, wherein the predetermined condition further includes a condition that a discharge amount of the backup low-voltage power supply after the vehicle power supply system is turned off most recently is equal to or larger than a predetermined value.

5. The vehicle power supply system according to claim 1, wherein the backup power supply controller controls the switching device to cut off a connection between the backup power supply system and the main power supply system and to supply electric power of the backup low-voltage power supply to the emergency important load when an abnormality occurs in the main power supply system.

6. The vehicle power supply system according to claim 1, wherein when the vehicle power supply system is turned on, the vehicle power supply system executes an abnormality determination processing of determining whether an abnormality occurs in the main power supply system.

7. The vehicle power supply system according to claim 1, further comprising:
a high-voltage power supply system that is provided with a high-voltage power supply configured to output electric power having a higher voltage than that of the main low-voltage power supply and the backup low-voltage power supply, and a high-voltage load operated with electric power having a higher voltage than that of the normal load and the emergency important load, and
a step-down device configured to step down electric power flowing through the high-voltage power supply system,
wherein the high-voltage power supply system is connected to the backup power supply system via the step-down device, and
wherein the backup low-voltage power supply is chargeable with electric power of the high-voltage power supply via the step-down device.

8. A vehicle power supply system mounted on a vehicle, the vehicle power supply system comprising:
a main power supply system that is provided with a main low-voltage power supply and a normal load; and
a backup power supply system that is provided with a backup low-voltage power supply and an emergency important load and is connected to the main power supply system, wherein the backup power supply system is configured to supply electric power of the backup low-voltage power supply to the main power supply system, wherein the backup power supply system includes
a switching device configured to switch a state of connection of the backup power supply system with the main power supply system between a connected state and a cut-off state, and
a backup power supply controller that controls the switching device, wherein the backup power supply controller is configured to
execute a backup low-voltage power supply state estimation processing of estimating whether the backup low-voltage power supply is in a state in which the backup low-voltage power supply is able to supply electric power for operating the emergency important load,
output a signal indicating whether the backup low-voltage power supply is in a state in which the backup low-voltage power supply is able to supply electric power for operating the emergency important load, based on an estimation result of the backup low-voltage power supply state estimation processing, and
execute the backup low-voltage power supply state estimation processing when the vehicle power supply system is turned off and a state of the vehicle satisfies a predetermined condition, and wherein the predetermined condition includes a condition that a temperature difference between a present temperature of the backup low-voltage power supply and a temperature of the backup low-voltage power supply when the vehicle power supply system is turned off most recently is equal to or larger than a predetermined value.

9. A vehicle power supply system mounted on a vehicle, the vehicle power supply system comprising:
a main power supply system that is provided with a main low-voltage power supply and a normal load; and
a backup power supply system that is provided with a backup low-voltage power supply and an emergency important load and is connected to the main power supply system, wherein the backup power supply system is configured to supply electric power of the backup low-voltage power supply to the main power supply system, wherein the backup power supply system includes
a switching device configured to switch a state of connection of the backup power supply system with the main power supply system between a connected state and a cut-off state, and
a backup power supply controller that controls the switching device, wherein the backup power supply controller is configured to
execute a backup low-voltage power supply state estimation processing of estimating whether the backup low-voltage power supply is in a state in which the backup low-voltage power supply is able to supply electric power for operating the emergency important load,
output a signal indicating whether the backup low-voltage power supply is in a state in which the backup low-voltage power supply is able to supply electric power for operating the emergency important load, based on an estimation result of the backup low-voltage power supply state estimation processing, and execute the backup low-voltage power supply state estimation processing when the vehicle power supply system is turned off and a state of the vehicle satisfies a predetermined condition, and wherein the predetermined condition includes a condition that a discharge amount of the backup low-voltage power supply after the vehicle power supply system is turned off most recently is equal to or larger than a predetermined value.

\* \* \* \* \*